US012418796B2

(12) United States Patent
Luo et al.

(10) Patent No.: US 12,418,796 B2
(45) Date of Patent: Sep. 16, 2025

(54) METHOD AND DEVICE FOR DETECTING USER DATA OF USER EQUIPMENT UE, AND STORAGE MEDIUM

(71) Applicant: Huawei Technologies Co., Ltd., Shenzhen (CN)

(72) Inventors: Qiming Luo, Beijing (CN); Yunze Wu, Beijing (CN); Chongqing Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 456 days.

(21) Appl. No.: 18/054,643

(22) Filed: Nov. 11, 2022

(65) Prior Publication Data

US 2023/0073813 A1   Mar. 9, 2023

Related U.S. Application Data

(63) Continuation of application No. PCT/CN2020/128841, filed on Nov. 13, 2020.

(30) Foreign Application Priority Data

May 12, 2020   (CN) .................... 202010399394.8

(51) Int. Cl.
*H04W 12/122* (2021.01)
*H04L 43/062* (2022.01)
(Continued)

(52) U.S. Cl.
CPC ......... *H04W 12/122* (2021.01); *H04L 43/062* (2013.01); *H04W 8/18* (2013.01); *H04W 24/08* (2013.01); *H04L 41/344* (2022.05)

(58) Field of Classification Search
CPC ..... H04W 12/122; H04W 8/18; H04W 24/08; H04W 12/088; H04W 12/68;
(Continued)

(56) References Cited

U.S. PATENT DOCUMENTS

| 2018/0098244 A1 | 4/2018 | Sutskover et al. |
| 2018/0109975 A1 | 4/2018 | Kalliola et al. |
| 2018/0324583 A1 | 11/2018 | Nair et al. |

FOREIGN PATENT DOCUMENTS

| CN | 109361660 A | 2/2019 |
| CN | 110096362 A | 8/2019 |

(Continued)

OTHER PUBLICATIONS

Wikipedia, "K-Means Clustering", https://en.wikipedia.org/wiki/K-means_clustering, last edited on Jun. 19, 2023, 17 pages.

(Continued)

*Primary Examiner* — Said M Elnoubi
(74) *Attorney, Agent, or Firm* — Slater Matsil, LLP

(57) ABSTRACT

This application discloses a method and device for detecting user data of UE, and a storage medium. The central detection node device determines abnormal UE based on core network signaling data, determines an abnormal group feature based on the abnormal UE and sends the abnormal group feature to an edge detection node device. Where the abnormal UE is UE with an abnormal behavior and the abnormal group feature includes an identifier or a user data transmission mode used by the abnormal UE to perform communication.

20 Claims, 11 Drawing Sheets

(51) Int. Cl.
*H04W 8/18* (2009.01)
*H04W 24/08* (2009.01)
*H04L 41/344* (2022.01)

(58) Field of Classification Search
CPC ... H04L 43/062; H04L 41/344; H04L 41/142; H04L 41/16; H04L 63/0236; H04L 63/1458; G06F 18/23
See application file for complete search history.

(56) References Cited

FOREIGN PATENT DOCUMENTS

| CN | 110225067 A | 9/2019 |
|---|---|---|
| CN | 110650034 A | 1/2020 |
| CN | 110661861 A | 1/2020 |
| CN | 111091278 A | 5/2020 |
| JP | 2006148750 A | 6/2006 |
| JP | 2006287818 A | 10/2006 |
| JP | 2008537385 A | 9/2008 |
| JP | 2009520447 A | 5/2009 |
| JP | 2019537366 A | 12/2019 |
| WO | WO-2009132552 A1 * | 11/2009 ......... H04L 63/1416 |
| WO | 2014057403 A1 | 4/2014 |
| WO | 2017101506 A1 | 6/2017 |
| WO | 2017154012 A1 | 9/2017 |

OTHER PUBLICATIONS

D518a9b6ae51,"K-Means Principle and Implementation (K-Means)", from Jianshu, May 26, 2019 , https://www.jianshu.com/p/e4d5aOfbcefe, with an English machine translation, 8 pages.

CATT, Samsung, "Update abnormal behaviour analytics", 3GPP TSG-SA WG2 Meeting #133, May 13-17, 2019, 4 pages, S2-1906093, Reno, NV, USA.

* cited by examiner

METHOD AND DEVICE FOR DETECTING USER DATA OF USER EQUIPMENT UE, AND STORAGE MEDIUM

CROSS-REFERENCE TO RELATED APPLICATIONS

This application is a continuation of International Application No. PCT/CN2020/128841, filed on Nov. 13, 2020, which claims priority to Chinese Patent Application No. 202010399394.8, filed on May 12, 2020. The disclosures of the aforementioned applications are hereby incorporated by reference in their entireties.

TECHNICAL FIELD

This application relates to the communications field, and further relates to an application of an artificial intelligence (AI) technology in the communications field, and in particular, to a method and device for detecting user data of user equipment (UE), and a storage medium.

BACKGROUND

Because of advantages of a high bandwidth and a low latency of a 5th generation (5G) mobile communications system network, an implementation basis is provided for an internet of vehicles, an intelligent signal light/road light, telemedicine, and remote construction. Therefore, 5G is deeply applied to various fields such as social transportation, healthcare, education, and industry along with internet of things (IoT). In addition, with an application of the IoT, impact of a network security problem is no longer limited to the economic field. More attention needs to be paid to a network security problem in IoT fields such as healthcare and transportation. Because there is massive UE access in scenarios of high deployment density of 5G base stations and massive machine type communication (mMTC), and there is high service availability in an ultra-reliable and low latency communications (uRLLC) scenario, a risk of a 5G network attack and harm caused by the attack are greatly increased. Therefore, 5G and IoT are commercially used on a large scale only in a case of security. Therefore, it is particularly important to perform security detection on user data.

SUMMARY

Embodiments of this application provide a method and device for detecting user data of UE, and a storage medium, to improve data detection efficiency. Technical solutions are as follows:

According to a first aspect, a data detection method is provided. That the method is applied to a central detection node device is used as an example. The method includes: The central detection node device obtains core network signaling data. For example, the core network signaling data includes call history record data. The central detection node device determines abnormal UE based on the core network signaling data. The abnormal UE is UE with an abnormal behavior. The central detection node device determines an abnormal group feature based on the abnormal UE. The abnormal group feature includes an identifier or a user data transmission mode used by the abnormal UE to perform communication. The central detection node device sends the abnormal group feature to an edge detection node device.

The abnormal UE is determined based on the core network signaling data. Because a quantity of abnormal UEs is less than a quantity of data plane users, after to-be-detected data is filtered based on the abnormal group feature determined based on the abnormal UE, only data obtained after filtering is detected, to reduce an amount of to-be-detected data, and improve detection efficiency and detection performance.

In an example embodiment, the obtaining core network signaling data includes: obtaining core network signaling data of a current periodicity.

The determining abnormal UE based on the core network signaling data includes: extracting a behavior feature of the current periodicity based on the core network signaling data of the current periodicity, where the behavior feature is a behavior feature of each of a plurality of UEs in a communication process; establishing a UE profile of the current periodicity based on the behavior feature of the current periodicity, where the UE profile is used to describe at least one UE group including the plurality of UEs, and UEs in each of the at least one UE group have a same behavior feature; and comparing the UE profile of the current periodicity and a UE profile of a reference periodicity, and determining the abnormal UE based on a comparison result, where the reference periodicity is a periodicity before the current periodicity.

In an example embodiment, the behavior feature of the current periodicity includes a time point indication of the current periodicity, one or more user identifiers, and a signaling category count array corresponding to each of the one or more user identifiers, the signaling category count array is an N-dimensional vector, a vector i in the N-dimensional vector corresponds to a signaling category i, a vector value of a vector i in a signaling category count array corresponding to a first user identifier in the one or more user identifiers is a signaling count value of a signaling category i of the first user identifier, a value of N is a natural number, and a value of i is greater than 0 and less than N. The establishing a UE profile of the current periodicity based on the behavior feature of the current periodicity includes: clustering the plurality of UEs of the current periodicity based on the signaling category count array corresponding to each of the one or more user identifiers, to obtain a clustering result, where the clustering result includes the at least one UE group; and using the obtained clustering result as the UE profile of the current periodicity.

In an example embodiment, the clustering result includes at least two UE groups, each of the at least two UE groups has a clustering center, for any selected UE group in the at least two UE groups, a signaling category count array corresponding to a clustering center of the selected UE group is an N-dimensional vector, a vector value of a vector i in the signaling category count array corresponding to the clustering center of the selected UE group is an average value of vector values of vectors i in signaling category count arrays corresponding to all user identifiers in the selected UE group, and a feature value of the selected UE group is a sum calculation result of N vector values included in the signaling category count array corresponding to the clustering center of the selected UE group.

The comparing the UE profile of the current periodicity and a UE profile of a reference periodicity, and determining the abnormal UE based on a comparison result includes: selecting one UE group from all UE groups of the current periodicity, and performing the following processing on the selected UE group, until each UE group of the current periodicity is processed:

calculating a sum of N vector values included in a signaling category count array corresponding to a clustering center of the selected UE group, to obtain a feature value corresponding to the selected UE group; and comparing the feature value corresponding to the selected UE group and feature values corresponding to all UE groups of the reference periodicity one by one, and if the case in which a difference between a feature value corresponding to a UE group and the feature value corresponding to the selected UE group is less than a specified threshold does not exist in the reference periodicity, determining that UE in the selected UE group is abnormal UE.

In an example embodiment, specified information of the abnormal UE includes at least one of an Internet Protocol IP, a port, a protocol type, and an international mobile subscriber identity IMSI of the abnormal UE.

In an example embodiment, the behavior feature of the current periodicity further includes at least one feature in a total amount of signaling, a signaling sending frequency, and access duration of the UE.

According to a second aspect, a method for detecting user data of UE is provided. The method is applied to an edge detection node device, and includes: The edge detection node device receives an abnormal group feature sent by a central detection node device, where the abnormal group feature includes an identifier or a user data transmission mode used by abnormal UE to perform communication; the edge detection node device obtains to-be-detected data; the edge detection node device filters the to-be-detected data based on the abnormal group feature; and the edge detection node device detects data obtained after filtering.

In an example embodiment, that the edge detection node device filters the to-be-detected data based on the abnormal group feature includes: selecting, from the to-be-detected data, data that satisfies the abnormal group feature, and using, as the data obtained after filtering, the data that satisfies the abnormal group feature.

In an example embodiment, specified information of the abnormal UE includes at least one of an Internet Protocol IP, a port, a protocol type, and an international mobile subscriber identity IMSI of the abnormal UE.

An apparatus for detecting user data of UE is provided. The apparatus includes: an obtaining module, configured to obtain core network signaling data; a first determining module, configured to determine abnormal UE based on the core network signaling data, where the abnormal UE is UE with an abnormal behavior; a second determining module, configured to determine an abnormal group feature based on the abnormal UE, where the abnormal group feature includes an identifier or a user data transmission mode used by the abnormal UE to perform communication; and a sending module, configured to send the abnormal group feature to an edge detection node device.

In an example embodiment, the obtaining module is configured to obtain core network signaling data of a current periodicity.

The first determining module is configured to: extract a behavior feature of the current periodicity based on the core network signaling data of the current periodicity, where the behavior feature is a behavior feature of each of a plurality of UEs in a communication process; establish a UE profile of the current periodicity based on the behavior feature of the current periodicity, where the UE profile is used to describe at least one UE group including the plurality of UEs, and UEs in each of the at least one UE group have a same behavior feature; and compare the UE profile of the current periodicity and a UE profile of a reference periodicity, and determine the abnormal UE based on a comparison result, where the reference periodicity is a periodicity before the current periodicity.

In an example embodiment, the behavior feature of the current periodicity includes a time point indication of the current periodicity, one or more user identifiers, and a signaling category count array corresponding to each of the one or more user identifiers, the signaling category count array is an N-dimensional vector, a vector i in the N-dimensional vector corresponds to a signaling category i, a vector value of a vector i in a signaling category count array corresponding to a first user identifier in the one or more user identifiers is a signaling count value of a signaling category i of the first user identifier, a value of N is a natural number, and a value of i is greater than 0 and less than N.

The first determining module is configured to: cluster the plurality of UEs of the current periodicity based on the signaling category count array corresponding to each of the one or more user identifiers, to obtain a clustering result, where the clustering result includes the at least one UE group; and use the obtained clustering result as the UE profile of the current periodicity.

In an example embodiment, the clustering result includes at least two UE groups, each of the at least two UE groups has a clustering center, for any selected UE group in the at least two UE groups, a signaling category count array corresponding to a clustering center of the selected UE group is an N-dimensional vector, a vector value of a vector i in the signaling category count array corresponding to the clustering center of the selected UE group is an average value of vector values of vectors i in signaling category count arrays corresponding to all user identifiers in the selected UE group, and a feature value of the selected UE group is a sum calculation result of N vector values included in the signaling category count array corresponding to the clustering center of the selected UE group.

The first determining module is configured to select one UE group from all UE groups of the current periodicity, and perform the following processing on the selected UE group, until each UE group of the current periodicity is processed: calculating a sum of N vector values included in a signaling category count array corresponding to a clustering center of the selected UE group, to obtain a feature value corresponding to the selected UE group; and comparing the feature value corresponding to the selected UE group and feature values corresponding to all UE groups of the reference periodicity one by one, and if the case in which a difference between a feature value corresponding to a UE group and the feature value corresponding to the selected UE group is less than a specified threshold does not exist in the reference periodicity, determining that UE in the selected UE group is abnormal UE.

In an example embodiment, specified information of the abnormal UE includes at least one of an Internet Protocol IP, a port, a protocol type, and an international mobile subscriber identity IMSI of the abnormal UE.

In an example embodiment, the behavior feature of the current periodicity further includes at least one feature in a total amount of signaling, a signaling sending frequency, and access duration of the UE.

An apparatus for detecting user data of UE is provided. The apparatus includes: a receiving module, configured to receive an abnormal group feature sent by a central detection node device, where the abnormal group feature includes an identifier or a user data transmission mode used by abnormal UE to perform communication; an obtaining module, configured to obtain to-be-detected data; a filtering module, configured to filter the to-be-detected data based on the abnormal group feature; and a detection module, configured to detect data obtained after filtering.

In an example embodiment, the filtering module is configured to select, from the to-be-detected data, data that satisfies the abnormal group feature, and use, as the data obtained after filtering, the data that satisfies the abnormal group feature.

In an example embodiment, specified information of the abnormal UE includes at least one of an Internet Protocol IP, a port, a protocol type, and an international mobile subscriber identity IMSI of the abnormal UE.

A device for detecting user data of UE is further provided. The device includes a memory and a processor, the memory stores at least one instruction, and the at least one instruction is loaded and executed by the processor, to implement the method for detecting user data of UE in any example embodiment of the first aspect.

A device for detecting user data of UE is further provided. The device includes a memory and a processor, the memory stores at least one instruction, and the at least one instruction is loaded and executed by the processor, to implement the method for detecting user data of UE in any example embodiment of the second aspect.

A system for detecting user data of UE is further provided. The system includes the foregoing two devices, and the foregoing two devices are at least one device.

A computer-readable storage medium is further provided. The storage medium stores at least one instruction, and the instruction is loaded and executed by a processor, to implement the method for detecting user data of UE in any example embodiment of the first aspect or the second aspect.

Another communications apparatus is provided. The apparatus includes a transceiver, a memory, and a processor. The transceiver, the memory, and the processor communicate with each other through an internal connection path, the memory is configured to store instructions, the processor is configured to execute the instructions stored in the memory, to control the transceiver to receive a signal and control the transceiver to send a signal, and when the processor executes the instructions stored in the memory, the processor is enabled to perform the method in any one of the first aspect and possible implementations of the first aspect, or the processor is enabled to perform the method in any one of the second aspect and possible implementations of the second aspect.

In an example embodiment, there are one or more processors, and there are one or more memories.

In an example embodiment, the memory may be integrated with the processor, or the memory and the processor are disposed separately.

In a specific implementation process, the memory may be a non-transitory memory, for example, a read-only memory (ROM). The memory and the processor may be integrated into a same chip, or may be disposed on different chips. A type of the memory and a manner in which the memory and the processor are disposed are not limited in this embodiment of this application.

A computer program (product) is provided. The computer program (product) includes computer program code, and when the computer program code is run by a computer, the computer is enabled to perform the method in any one of the foregoing aspects.

A chip is provided, including a processor, configured to invoke, from a memory, instructions stored in the memory, and run the instructions, so that a communications device on which the chip is installed performs the method in any one of the foregoing aspects.

Another chip is provided, including an input interface, an output interface, a processor, and a memory. The input interface, the output interface, the processor, and the memory are connected through an internal connection path, the processor is configured to execute code in the memory, and when the code is executed, the processor is configured to perform the method in any one of the foregoing aspects.

DETAILED DESCRIPTION OF ILLUSTRATIVE EMBODIMENTS

Terms used in embodiments of this application are only used to explain embodiments of this application, and are not intended to limit this application.

Because of advantages of a high bandwidth and a low latency of a 5G network, an implementation basis is provided for an internet of vehicles, an intelligent signal light/road light, telemedicine, and remote construction. However, because there is massive UE access in scenarios of high deployment density of 5G base stations and mMTC, and there is high service availability in a uRLLC scenario, a risk of a 5G network attack and harm caused by the attack are greatly increased. Therefore, it is particularly important to perform security detection on user data.

However, there is heavy traffic on a data plane, and a large quantity of resources need to be consumed to detect user data. If there is a limited network bandwidth on a management plane, all data cannot be sent to a central detection node device on the management plane for detection. The data plane is used for packet forwarding of a network device, and the management plane is used for management and maintenance of a core network device. Therefore, in a communications system, an edge detection function is locally deployed on the data plane. In other words, an edge detection node device is disposed. The edge detection node device performs security detection on heavy-traffic data on the data plane. Then, the data plane sends a detection result to the central detection node device on the management plane, so that the central detection node device performs comprehensive processing.

For example, if user data traffic is approximately 300 G and the edge detection node device has a processing capability of about 6 G, 50 edge detection node devices need to be deployed to match the user data traffic. However, due to a cost limitation, it is possible that a user cannot accept that 50 edge detection node devices are deployed, resulting in a huge gap between to-be-detected traffic and a detection capability of the edge detection node device. Therefore, a method for performing sampling detection on traffic is used in a related technology. However, according to the method, a sample is seriously distorted, and detection cannot be effectively performed.

Figure 1:
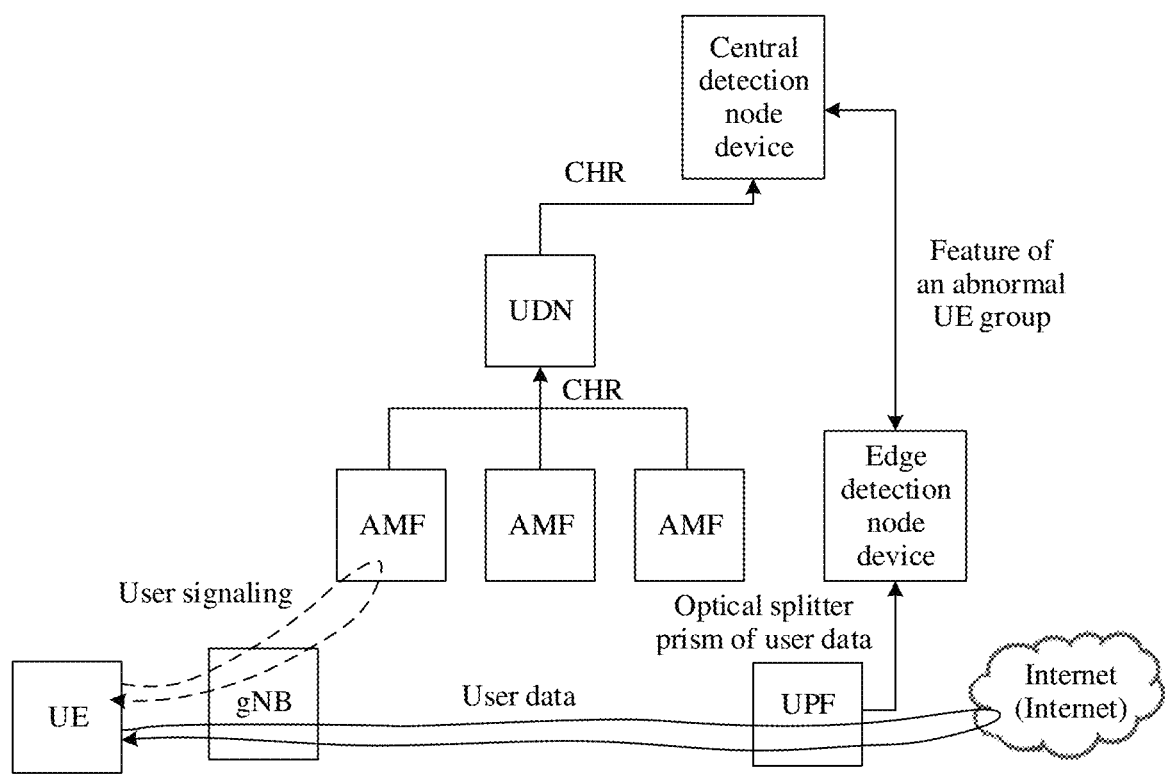
FIG. 1 is a schematic diagram of an architecture of a system for detecting user data of UE according to an embodiment of this application.

To resolve a problem that to-be-detected traffic on a data plane far exceeds a processing capability of an edge detection node device, an embodiment of this application provides a method for detecting user data of UE. In the method, a data filtering mechanism is used, to reduce an amount of to-be-detected data. For example, the method provided in this embodiment of this application may be applied to a system architecture shown in FIG. 1. As shown in FIG. 1, the system architecture includes UE, a gNB, an access management function (AMF), a user plan function (UPF), a unified data node (UDN), a central detection node device, and an edge detection node device.

The gNB is a base station in a 5G wireless network, the AMF is a network element device that processes a signaling request in a core network, and the UPF is a network element device that processes user data generated by the UE in the core network. A network element or a network element device in this embodiment of this application is a logic device or a physical device that implements a specific processing function. The UDN may also be considered as a call history record (CHR) server, and is configured to aggregate CHR data of an AMF network element, and provide a secure file transfer protocol (SFTP) service, to externally transmit CHR data. The central detection node device includes a cyber intelligent security (CIS) detection system. The CIS detection system collects CHR data from the UDN by using a file transfer protocol (FTP) protocol. The edge detection node device includes an artificial intelligence engine (AIE), and the AIE is configured to obtain data on a data plane of the UPF from an optical splitter (an optical splitter of user data shown in FIG. 1), to perform threat analysis and detection.

Figure 2:
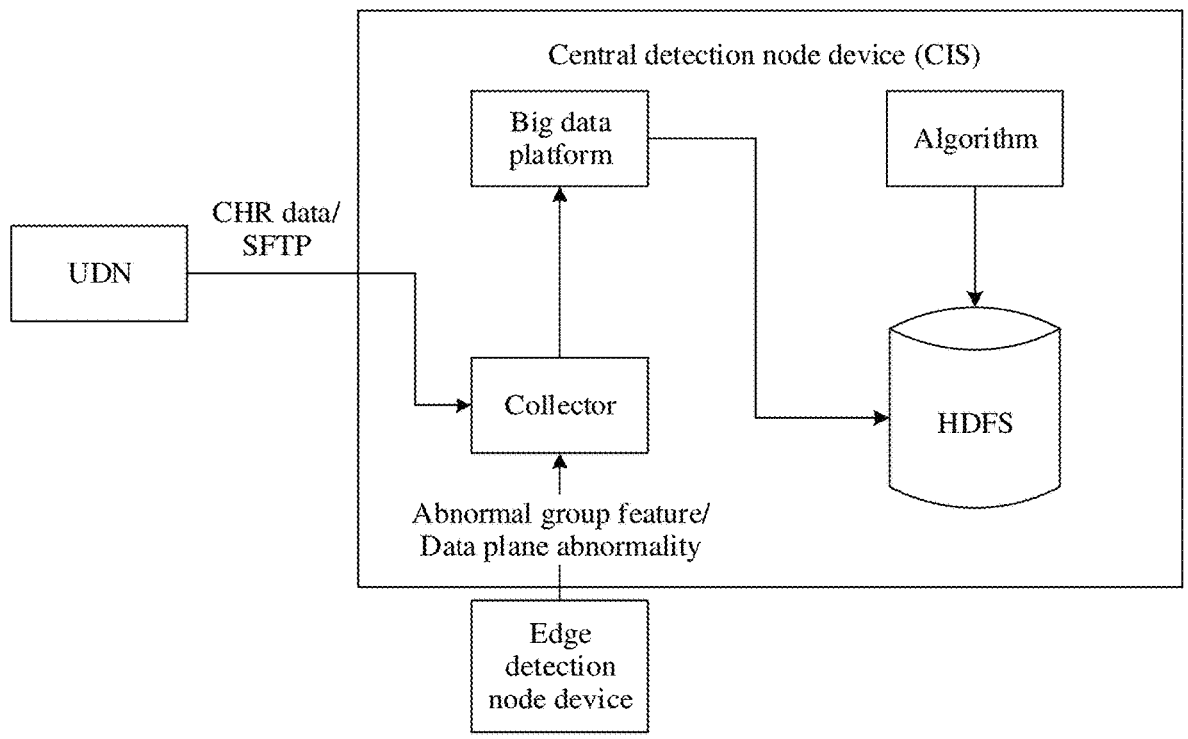
FIG. 2 is a schematic diagram of a structure of a central detection node device according to an embodiment of this application.

As shown in FIG. 2, the central detection node device includes a collector, a big data platform, and a hadoop distributed file system (HDFS). The collector is responsible for collecting data from an external network element and another data source. For example, the collector collects CHR data, namely, core network signaling data, that is externally transmitted by the UDN by using the SFTP service. The collector parses the collected data, and then sends the parsed data to the big data platform. After receiving the data sent by the collector, the big data platform stores the data, for example, stores the data by using the HDFS. In addition, the central detection node device further analyzes and detects the data by using an algorithm model, and finds abnormal UE. After determining an abnormal group feature based on the abnormal UE, the abnormal group feature is sent to the edge detection node device.

Figure 3:
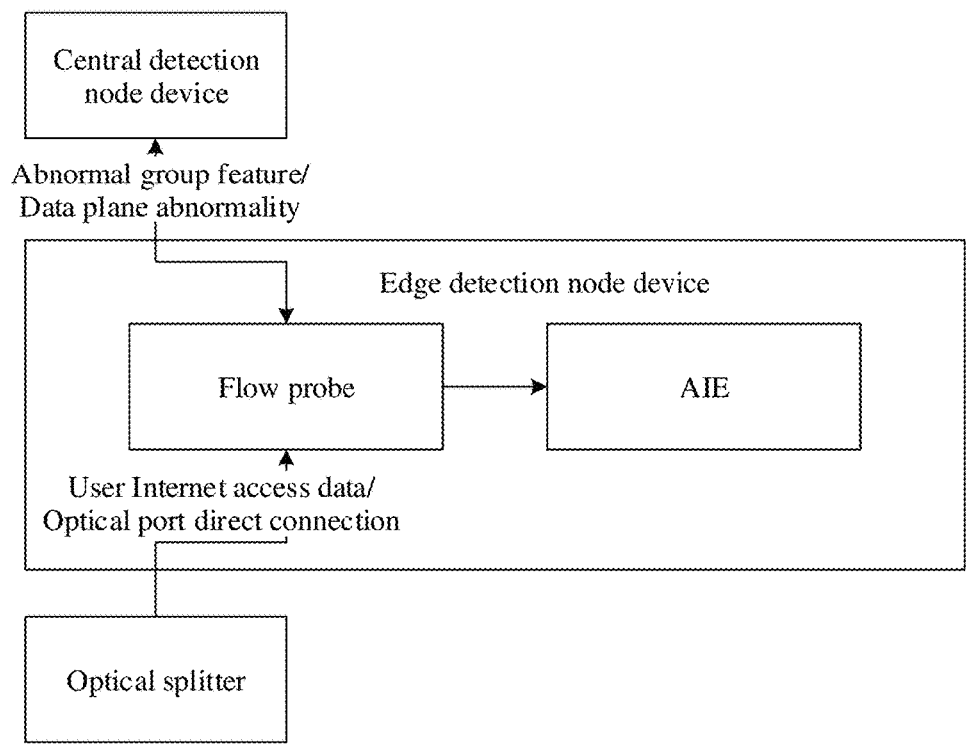
FIG. 3 is a schematic diagram of a structure of an edge detection node device according to an embodiment of this application.

As shown in FIG. 3, the edge detection node device includes a flow probe and the AIE. The optical splitter is configured to copy user data on a data plane in a core network, and send the user data to the flow probe. The flow probe is a traffic collection component, and is responsible for collecting traffic from a network interface card of the optical splitter, extracting metadata, and sending the metadata to the AIE. The AIE is an edge AI detection engine, and analyzes and detects data reported by the flow probe. After obtaining the abnormal group feature (for example, a UE IP) from the central detection node device, the edge detection node device filters, by using the abnormal group feature as a filtering condition, the user data obtained by the optical splitter, uses, as input data for further detection, a user data packet that meets a condition, and discards a user data packet that does not meet the condition, to reduce an amount of data that needs to be detected.

For example, signaling is related control information that is transferred between various devices in a communications network, so that the devices operate through coordination. The control information is used to describe respective operation of the devices, and provide a continuity requirement to a related device. The user data is service-related data generated by the UE, for example, data sent or received by the UE.

It should be noted that in FIG. 1 to FIG. 3, a 5G network scenario is used as an example to describe a possible application scenario of the method for detecting user data of UE provided in this embodiment of this application. The method for detecting user data of UE provided in this embodiment of this application is not limited to the scenario shown in FIG. 1 to FIG. 3, and another network scenario in which core network signaling data can be obtained is also applicable to the method for detecting user data provided in this embodiment of this application.

Figure 4:
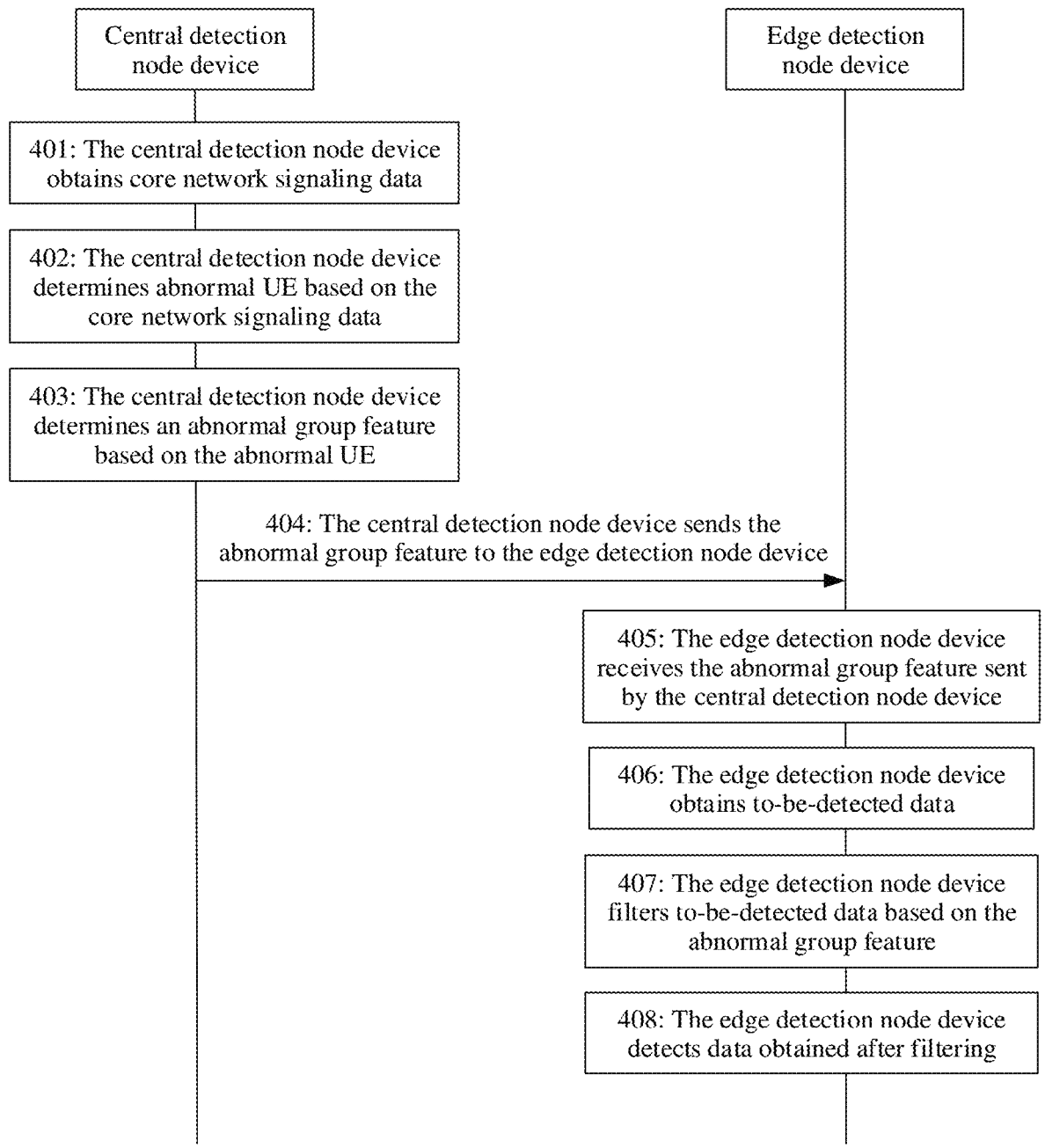
FIG. 4 is a schematic interaction diagram of a method for detecting user data of UE according to an embodiment of this application.

With reference to the system architecture shown in FIG. 1, a process in which the central detection node device shown in FIG. 2 and the edge detection node device shown in FIG. 3 interact is used as an example to describe the method for detecting user data of UE provided in this embodiment of this application. Referring to FIG. 4, the method includes the following process.

401: The central detection node device obtains core network signaling data.

As shown in FIG. 2, the central detection node device may collect data from an external network element and another data source by using a collector. For example, the collector collects CHR data that is externally transmitted by a UDN by using an SFTP service, to obtain the core network signaling data. The core network signaling data may also be referred to as user signaling data. In this embodiment of this application, an occasion and a quantity of times of obtaining the core network signaling data are not limited. For example, the core network signaling data may be obtained based on a periodicity. For example, core network signaling data of a current periodicity is obtained. In this embodiment of this application, a length of a periodicity of obtaining the core network signaling data is not limited. For example, 15 days are one periodicity. In other words, CHR data is collected once from the UDN every 15 days, to obtain the core network signaling data.

402: The central detection node device determines abnormal UE based on the core network signaling data.

Optionally, the abnormal UE is UE whose behavior is different from that of UE that executes a normal communication behavior. The abnormal UE may be UE whose behavior is susceptible, or may be UE in a botnet controlled by a hacker. The abnormal UE may severely damage an entire communications system. For example, if the abnormal UE is UE in the botnet controlled by the hacker, the hacker controls a large quantity of UEs in the botnet to initiate a DDoS attack. Therefore, it is particularly important to perform security detection on user data of the abnormal UE.

Figure 5:
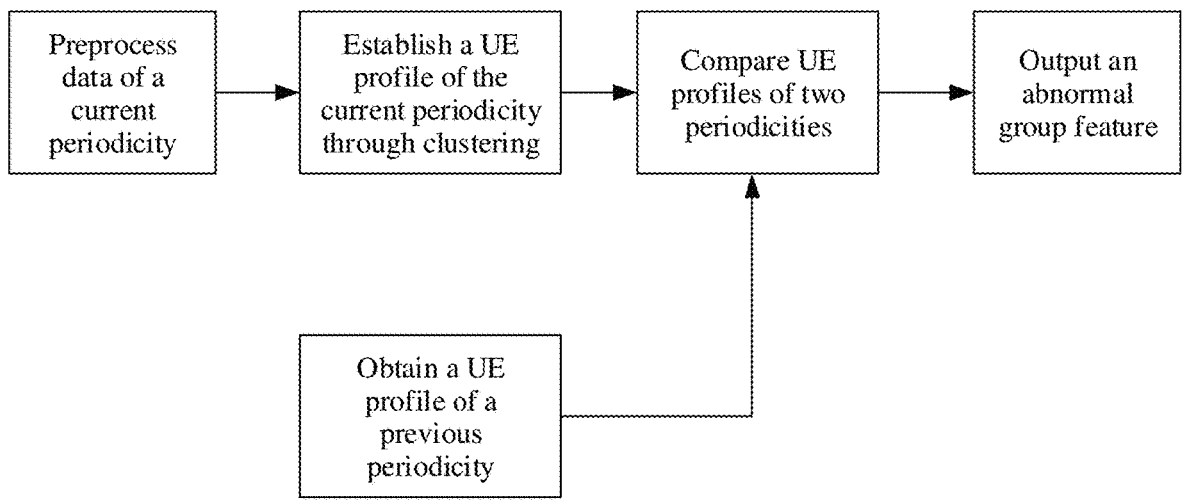
FIG. 5 is a schematic diagram of a process of determining abnormal UE according to an embodiment of this application.

In an example embodiment, the determining abnormal UE based on the core network signaling data includes: extracting a behavior feature of the current periodicity based on the core network signaling data of the current periodicity, where the behavior feature is a behavior feature of each of a plurality of UEs in a communication process; establishing a UE profile of the current periodicity based on the behavior feature of the current periodicity, where the UE profile is used to describe at least one UE group including the plurality of UEs, and UEs in each of the at least one UE group have a same behavior feature; and comparing the UE profile of the current periodicity and a UE profile in a reference periodicity, and determining the abnormal UE based on a comparison result, where the reference periodicity is a periodicity before the current periodicity. For example, a process of determining the abnormal UE may be shown in FIG. 5. In FIG. 5, that a previous periodicity of the current periodicity is used as a reference periodicity is used as an example. Data of the current periodicity is preprocessed. To be specific, the behavior feature of the current periodicity is extracted based on the core network signaling data of the current periodicity.

For example, after obtaining core network signaling data of each periodicity (for example, 15 minutes) from the UDN, the central detection node device extracts the behavior feature of the current periodicity based on the core network signaling data of the current periodicity. The behavior feature is a behavior feature of each of the plurality of UEs in the communication process. The behavior feature of the current periodicity includes but is not limited to the following:

Periodicity time point indication: The periodicity time point indication is used to indicate a specific time range in which a data collection periodicity is located. For example, the periodicity time point indication is any time point in the indicated time range in which the data collection periodicity is located. In other words, a time point in the data collection periodicity is used as a periodicity time point, and the periodicity time point is used to indicate the specific time range in which the data collection periodicity is located. In addition, all behavior features of a same data collection periodicity include a same periodicity time point indication. That the data collection periodicity is a current periodicity is used as an example, and all behavior features of the current periodicity include a same periodicity time point indication. Optionally, the periodicity time point indication included in all the behavior features of the current periodicity is a start time point of the current periodicity, and the start time point of the current periodicity is used to indicate a specific time range in which the current periodicity is located. For example, the start time point of the current periodicity is 12:00 on Dec. 25, 2019, and an end time point is 12:00 on Dec. 26, 2019. Therefore, a periodicity time point indication used to indicate the specific time range in which the current periodicity is located is 12:00 on Dec. 25, 2019, and is represented as 2019-12-25:12:00. Alternatively, the periodicity time point indication included in all the behavior features of the current periodicity is an end time point of the current periodicity, and the end time point of the current periodicity is used to indicate a specific time range in which the current periodicity is located. That the start time point of the current periodicity is 12:00 on Dec. 25, 2019, and an end time point is 12:00 on Dec. 26, 2019 is still used as an example. Therefore, a periodicity time point indication used to indicate the specific time range in which the current periodicity is located is 12:00 on Dec. 26, 2019, and is represented as 2019-12-26:12:00.

User identifier: For example, an international mobile subscriber identity (IMSI) is used as a user data identifier, and periodicity data is at a granularity of a user.

Signaling category count array corresponding to a user identifier: The signaling category count array indicates a count of signaling requests of each type sent by the UE. The signaling category count array is an N-dimensional vector, a vector i in the N-dimensional vector corresponds to a signaling category i, a vector value of a vector i in a signaling category count array corresponding to a first user identifier in one or more user identifiers is a signaling count value of a signaling category i of the first user identifier, a value of N is a natural number, and a value of i is greater than 0 and less than N. For example, a selection range of signaling categories included in the signaling category count array includes but is not limited to 53 signaling categories shown in Table 1. In other words, vectors included in the signaling category count array are signaling categories in a specified signaling category set, and vector values are signaling counts corresponding to the signaling categories in the specified signaling category set. Optionally, the signaling categories included in the specified signaling category set are some or all of the 53 signaling categories shown in Table 1, or may include a signaling category other than the 53 signaling categories in Table 1.

TABLE 1

| Signaling procedure category name | Quantity of signaling procedures |
|---|---|
| 00: "Attach", | xxxxx |
| 01: "Intra_USN_Intra_E-UTRAN_TAU", | xxxxx |
| 02: "Inter_USN_Intra_E-UTRAN_TAU", | xxxxx |
| 05: "Ms_Init_Detach", | xxxxx |
| 06: "CN_Init_Detach", | xxxxx |
| 0A: "Paging", | xxxxx |
| 0B: "Service_Request", | xxxxx |
| 0C: "Intra_USN_GERAN_to_E-UTRAN_Inter_RAT_TAU", | xxxxx |
| 0D: "Intra_USN_UTRAN_to_E-UTRAN_Inter_RAT_TAU", | xxxxx |
| 10: "Inter_USN_GERAN/UTRAN_to_E-UTRAN_TAU", | xxxxx |

TABLE 1-continued

| Signaling procedure category name | Quantity of signaling procedures |
|---|---|
| 12: "Intra_USN_E-UTRAN_to_GERAN_Inter_RAT_RAU", | xxxxx |
| 13: "Intra_USN_E-UTRAN_to_UTRAN_Inter_RAT_RAU", | xxxxx |
| 16: "Inter_USN_E-UTRAN_to_GERAN/UTRAN_Inter_RAT_RAU", | xxxxx |
| 18: "Combined_Attach", | xxxxx |
| 19: "Intra_USN_Intra_E-UTRAN_Combined_TAU", | xxxxx |
| 1A: "Inter_USN_Intra_E-UTRAN_Combined_TAU", | xxxxx |
| 1B: "Intra_USN_GERAN_to_E-UTRAN_Inter_RAT_Combined_TAU", | xxxxx |
| 1C: "Intra_USN_UTRAN_to_E-UTRAN_Inter_RAT_Combined_TAU", | xxxxx |
| 1D: "Inter_USN_GERAN/UTRAN_to_E-UTRAN_Combined_TAU", | xxxxx |
| 1E: "Extended_Service_Request", | xxxxx |
| 20: "Ms_Init_Combined_Detach", | xxxxx |
| 21: "Ms_Init_IMSI_Detach", | xxxxx |
| 22: "CN_Init_IMSI_Detach", | xxxxx |
| 23: "CN_Init_Implicit_Detach", | xxxxx |
| 24: "Intra_USN_Intra_E-UTRAN_Periodic_TAU", | xxxxx |
| 25: "Inter_TAU_Old", | xxxxx |
| 30: "Dedicated_bearer_activation", | xxxxx |
| 31: "PDN_GW_initiated_bearer_modification_with_bearer_QoS_update", | xxxxx |
| 32: "HSS_Initiated_Subscribed_QoS_Modification", | xxxxx |
| 33: "PDN_GW_initiated_bearer_modification_without_bearer_QoS_update", | xxxxx |
| 34: "PDN_GW_initiated_bearer_deactivation", | xxxxx |
| 35: "MME_Initiated_Dedicated_Bearer_Deactivation", | xxxxx |
| 36: "UE_requested_bearer_resource_modification", | xxxxx |
| 37: "UE_requested_PDN_connectivity", | xxxxx |
| 38: "UE_or_MME_requested_PDN_disconnection", | xxxxx |
| 3A: "UE_requested_bearer_resource_allocation", | xxxxx |
| 3B: "Default_bearer_activation_in_attach", | xxxxx |
| 3C: "MME_requested_PDN_disconnection", | xxxxx |
| 3D: "Create_Session_with_SGW_relocation", | xxxxx |
| 03: "eNodeB_S1_Release", | xxxxx |
| 04: "CN_Init_S1_Release", | xxxxx |
| 07: "X2_HandOver", | xxxxx |
| 08: "Intra_MME_S1_HandOver", | xxxxx |
| 09: "Inter_MME_S1_HandOver", | xxxxx |
| 0E: "Intra_USN_UTRAN_Iu_mode_to_E-UTRAN_Inter_RAT_handover", | xxxxx |
| 0F: "Inter_USN_UTRAN_Iu_mode_to_E-UTRAN_Inter_RAT_handover", | xxxxx |
| 14: "Intra_USN_E-UTRAN_to_UTRAN_Iu_mode_Inter_RAT_handover", | xxxxx |
| 15: "Inter_USN_E-UTRAN_to_UTRAN_Iu_mode_Inter_RAT_handover", | xxxxx |
| 26: "Inter_MME_S1_HandOver_old", | xxxxx |
| 40: "SRVCC_from_E-UTRAN_to_GERAN_or_UTRAN", | xxxxx |
| 41: "SGs_Paging", | xxxxx |
| FF: "Unknown", | xxxxx |
| 46: "Abnormal_IMS_Dedicated_Bearer_Deactivation" | xxxxx |

For example, a behavior feature of the UE includes information shown in Table 2. That content ""Attach":11, "Intra_USN_Intra_E-UTRAN-TAU":0," in a first row in Table 2 is used as an example. Herein, "Attach":11 indicates that a count value of "Attach" signaling is 11. In other words, UE whose user identifier is 460030912121001 generates 11 pieces of "Attach" signaling in a periodicity indicated by a periodicity time point indication of 2019-12-25:12:00.

TABLE 2

| Periodicity time point indication | User identifier (IMSI) | Signaling category count array |
|---|---|---|
| Dec. 25, 2019; 12:00 PM | 460030912121001 | "Attach": 11, "Intra_USN_Intra_E-UTRAN-TAU": 0, "Inter_USN_Intra_E-UTRAN_TAU": 0, "Ms_Init_Detach": 11, "CN_Init_Detach": 0, "Paging": 0, "Service_Request": 2, "Intra_USN_GERAN_to_E-UTRAN_Inter_RAT_TAU": 0, "Intra_USN_UTRAN_to_E-UTRAN_Inter_RAT_TAU": 0, "Inter_USN_GERAN/UTRAN_to_E-UTRAN_TAU": 0, "Intra_USN_E-UTRAN_to_GERAN_Inter_RAT_RAU": 23, "Intra_USN_E-UTRAN_TO_UTRAN_Inter_RAT_RAR": 62, "Inter_USN_E-UTRAN_to_GERAN/UTRAN_Inter_RAT_RAU": 0, "Combined_Attach": 0, "Intra_USN_Intra_E-UTRAN_Combined_TAU": 0, "Inter_USN_GERAN_to_E-UTRAN_Inter_RAT_Combined_TAU": 34, "Intra_USN_UTRAN_to_E-UTRAN_Combined_TAU": 0, "Inter_USN_GERAN/UTRAN_to_E-UTRAN_Combined_TAU": 0, "Extended_Service_Request": 0, "Ms_Init_Combined_Detach": 0, "Ms_Init_IMSI_Detach": 0, "CN_Init_IMSI_Detach": 0, "CN_Init_Implicit_Detach": 0, "Intra_USN_Intra_E-UTRAN_Periodic_TAU": 0, "Inter_TAU_Old": 0, "HSS_Initiated_Subscribed_Qos_Modification": 0, "PDN_GW_initiated_bearer_modification_without_bearer_Qos_update": 0 |
| Dec. 25, 2019; 12:00 PM | 460030912121002 | "Attach": 10, "Intra_USN_Intra_E-UTRAN-TAU": 0, "Inter_USN_Intra_E-UTRAN_TAU": 0, "Ms_Init_Detach": 10, "CN_Init_Detach": 0, "Paging": 0, "Service_Request": 5, "Intra_USN_GERAN_to_E-UTRAN_Inter_RAT_TAU": 0, "Intra_USN_UTRAN_to_E-UTRAN_Inter_RAT_TAU": 0, "Inter_USN_GERAN/UTRAN_to_E-UTRAN_TAU": 0, "Intra_USN_E-UTRAN_to_GERAN_Inter_RAT_RAU": 21, "Intra_USN_E- |

TABLE 2-continued

| Periodicity time point indication | User identifier (IMSI) | Signaling category count array |
|---|---|---|
| | | UTRAN_TO_UTRAN_Inter_RAT_RAR": 52, "Inter_USN_E-UTRAN_to_GERAN/UTRAN_Inter_RAT_RAU": 0, "Combined_Attach": 0, "Intra_USN_Intra_E-UTRAN_Combined_TAU": 0, "Inter_USN_GERAN_to_E-UTRAN_Inter_RAT_Combined_TAU": 0, "Intra_USN_UTRAN_to_E-UTRAN_Combined_TAU": 0, "Inter_USN_GERAN/UTRAN_to_E-UTRAN_Combined_TAU": 0, "Extended_Service_Request": 0, "Ms_Init_Combined_Detach": 0, "Ms_Init_IMSI_Detach": 0, "CN_Init_IMSI_Detach": 0, "CN_Init_Implicit_Detach": 0, "Intra_USN_Intra_E-UTRAN_Periodic_TAU": 0, "Inter_TAU_Old": 0, "HSS_Initiated_Subscribed_Qos_Modification": 0, "PDN_GW_initiated_bearer_modification_without_bearer_Qos_update": 0 |
| Dec. 25, 2019: 12:00 PM | 460030912121003 | "Attach": 13, "Intra_USN_Intra_E-UTRAN-TAU": 0, "Inter_USN_Intra_E-UTRAN_TAU": 0, "Ms_Init_Detach": 11, "CN_Init_Detach": 0, "Paging": 0, "Service_Request": 3, "Intra_USN_GERAN_to_E-UTRAN_Inter_RAT_TAU": 0, "Intra_USN_UTRAN_to_E-UTRAN_Inter_RAT_TAU": 0, "Inter_USN_GERAN/UTRAN_to_E-UTRAN_TAU": 0, "Intra_USN_E-UTRAN_to_GERAN_Inter_RAT_RAU": 25, "Intra_USN_E-UTRAN_TO_UTRAN_Inter_RAT_RAR": 58, "Inter_USN_E-UTRAN_to_GERAN/UTRAN_Inter_RAT_RAU": 0, "Combined_Attach": 0, "Intra_USN_Intra_E-UTRAN_Combined_TAU": 0, "Inter_USN_GERAN_to_E-UTRAN_Inter_RAT_Combined_TAU": 0, "Intra_USN_UTRAN_to_E-UTRAN_Combined_TAU": 29, "Inter_USN_GERAN/UTRAN_to_E-UTRAN_Combined_TAU": 0, "Extended_Service_Request": 0, "Ms_Init_Combined_Detach": 0, "Ms_Init_IMSI_Detach": 0, "CN_Init_IMSI_Detach": 0, "CN_Init_Implicit_Detach": 0, "Intra_USN_Intra_E-UTRAN_Periodic_TAU": 0, "Inter_TAU_Old": 0, "HSS_Initiated_Subscribed_Qos_Modification": 0, "PDN_GW_initiated_bearer_modification_without_bearer_Qos_update": 0 |
| Dec. 25, 2019: 12:00 PM | 460030912122000 | "Attach": 9, "Intra_USN_Intra_E-UTRAN-TAU": 0, "Inter_USN_Intra_E-UTRAN_TAU": 0, "Ms_Init_Detach": 9, "CN_Init_Detach": 0, "Paging": 0, "Service_Request": 2, "Intra_USN_GERAN_to_E-UTRAN_Inter_RAT_TAU": 0, "Intra_USN_UTRAN_to_E-UTRAN_Inter_RAT_TAU": 0, "Inter_USN_GERAN/UTRAN_to_E-UTRAN_TAU": 0, "Intra_USN_E-UTRAN_to_GERAN_Inter_RAT_RAU": 28, "Intra_USN_E-UTRAN_TO_UTRAN_Inter_RAT_RAR": 61, "Inter_USN_E-UTRAN_to_GERAN/UTRAN_Inter_RAT_RAU": 0, "Combined_Attach": 0, "Intra_USN_Intra_E-UTRAN_Combined_TAU": 0, "Inter_USN_GERAN_to_E-UTRAN_Inter_RAT_Combined_TAU": 31, "Intra_USN_UTRAN_to_E-UTRAN_Combined_TAU": 0, "Inter_USN_GERAN/UTRAN_to_E-UTRAN_Combined_TAU": 0, "Extended_Service_Request": 0, "Ms_Init_Combined_Detach": 0, "Ms_Init_IMSI_Detach": 0, "CN_Init_IMSI_Detach": 0, "CN_Init_Implicit_Detach": 0, "Intra_USN_Intra_E-UTRAN_Periodic_TAU": 0, "Inter_TAU_Old": 0, "HSS_Initiated_Subscribed_Qos_Modification": 0, "PDN_GW_initiated_bearer_modification_without_bearer_Qos_update": 0 |

Figure 6:
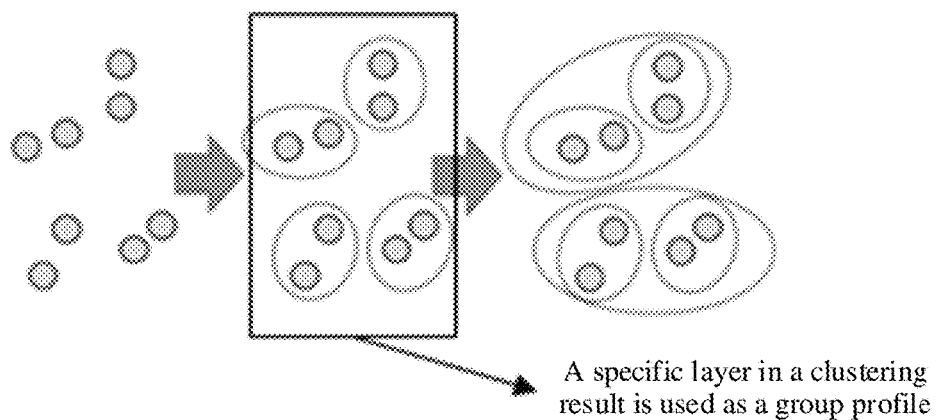
FIG. 6 is a schematic diagram of a UE profile according to an embodiment of this application.

The establishing a UE profile of the current periodicity based on the behavior feature of the current periodicity includes but is not limited to: clustering the plurality of UEs of the current periodicity based on the signaling category count array corresponding to each of the one or more user identifiers, to obtain a clustering result, where the clustering result includes the at least one UE group; and using the obtained clustering result as the UE profile of the current periodicity. As shown in FIG. 6, the plurality of UEs of the current periodicity are clustered, to obtain the clustering result, and the obtained clustering result is used as the UE profile of the current periodicity. Clustering is a process of classifying and organizing data members whose data is similar in some aspects. Clustering is a technology used to such an internal structure. The clustering technology is usually referred to as unsupervised learning. In this embodiment of this application, a machine learning clustering algorithm may be used to find an abnormal group, namely, the abnormal UE. For example, a specific layer in the clustering result may also be used as a UE profile.

A clustering manner is not limited in this embodiment of this application. The following provides descriptions by using a KMeans algorithm as an example. K-means clustering (KMeans) is a partition and clustering algorithm. A data point set and a required quantity k of clusters are given, k is specified by the user, and a k-mean algorithm is to repeatedly divide data into k clusters based on a distance function. Then, a distance between each object and each seed clustering center is calculated, and each object is allocated to a clustering center closest to the object. A clustering center and an object allocated to the clustering center represent one cluster. Once all objects are allocated, a clustering center of each cluster is recalculated based on an object that has been in the cluster. For example, a clustering process of the KMeans algorithm includes the following several steps of Step 1 to Step 10.

Figure 7:
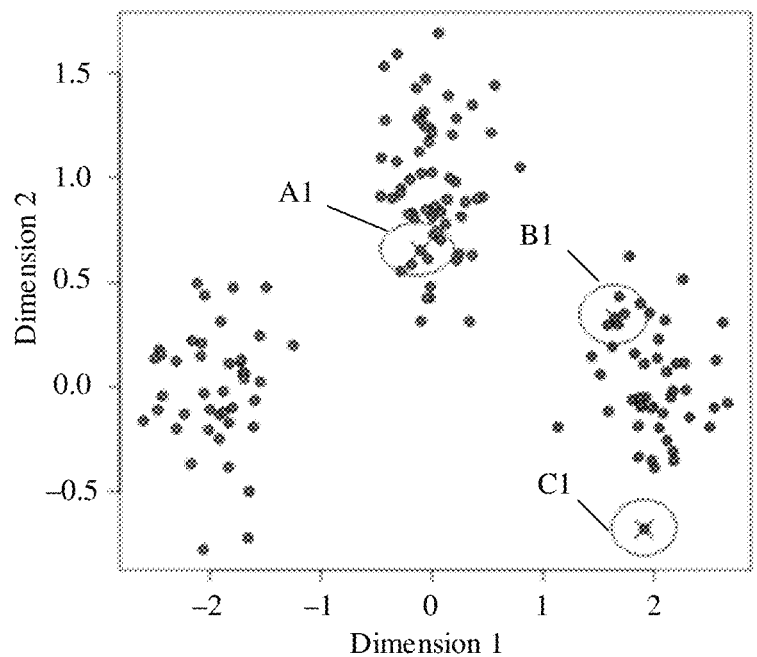
FIG. 7 is a schematic diagram of a clustering process according to an embodiment of this application.

Step 1: The central detection node device determines K clustering center points. Optionally, the K clustering center points are randomly specified by a user of the central detection node device. For example, K is 3. Three clustering center points are shown as A1, B1, and C1 in FIG. 7. Then, for a signaling category count array (briefly referred to as a data point) corresponding to a user identifier of each UE, the central detection node device classifies the data point into a closest clustering center point based on distances between the data point and the three clustering center points.

Figure 8:
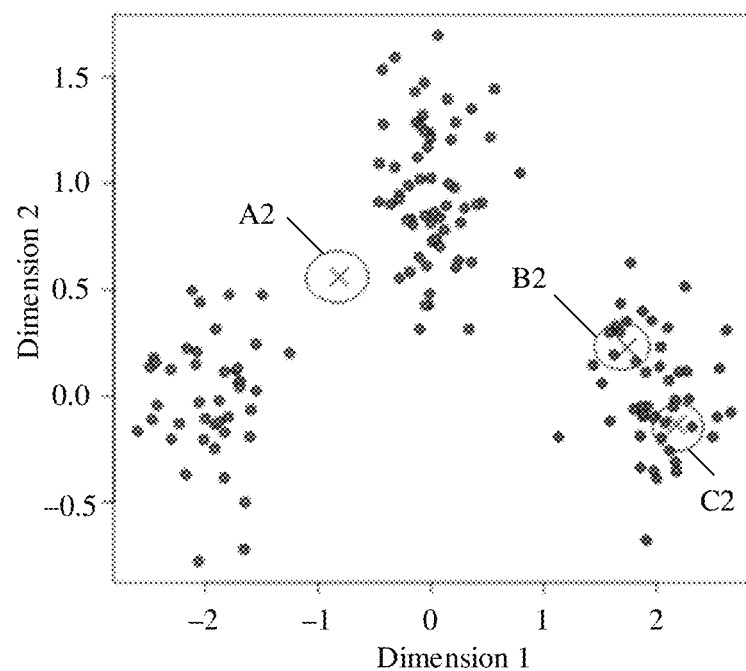
FIG. 8 is a schematic diagram of a clustering process according to an embodiment of this application.

Step 2: The central detection node device adjusts three clustering center point locations based on a current data point distribution location. The adjusted three clustering center point locations are shown as A2, B2, and C2 in FIG. 8.

Figure 9:
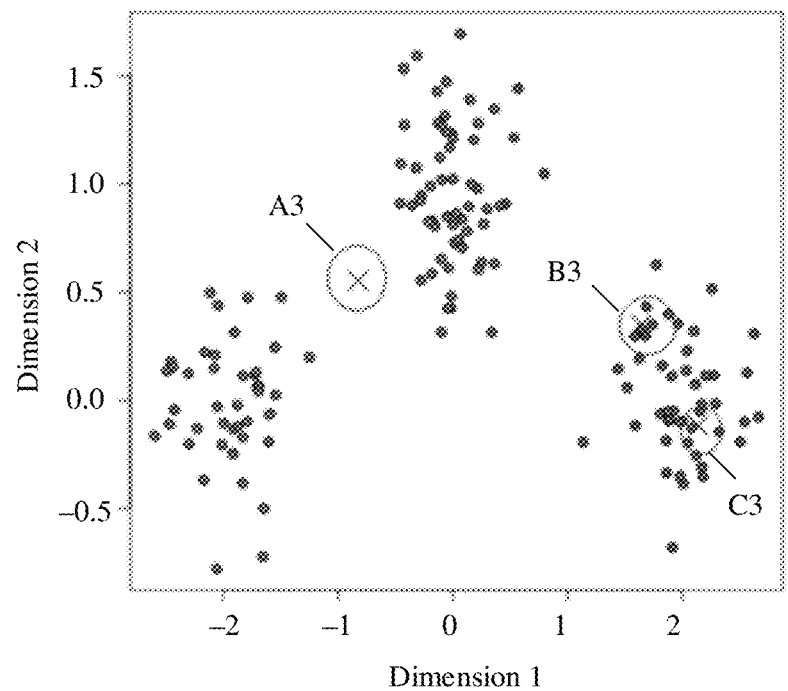
FIG. 9 is a schematic diagram of a clustering process according to an embodiment of this application.

Step 3: The central detection node device re-enters each data point, and obtains, through division based on a new clustering center point location, a cluster to which the data point belongs. Locations of three new clustering centers are shown as A3, B3, and C3 in FIG. 9. Based on the adjusted clustering center point locations in FIG. 8, each data point is clustered based on a new clustering center point location.

Figure 10:
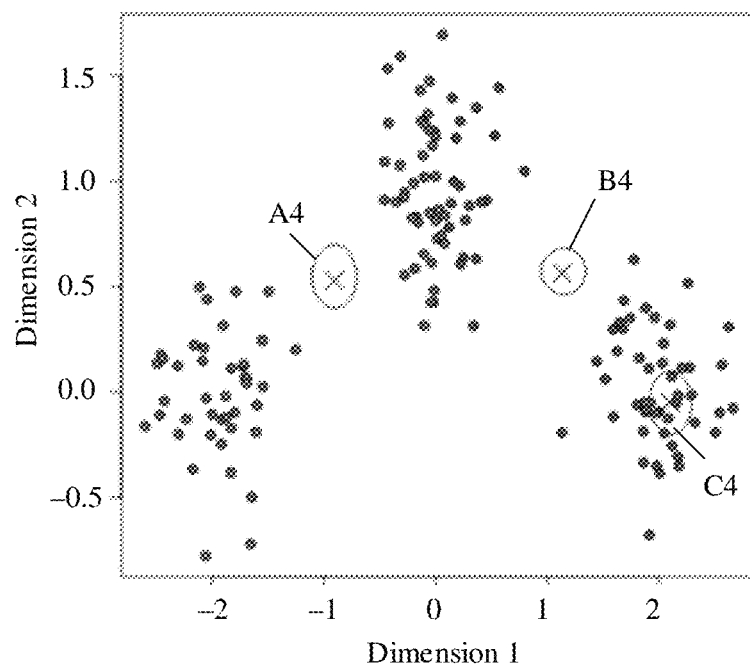
FIG. 10 is a schematic diagram of a clustering process according to an embodiment of this application.
Figure 11:
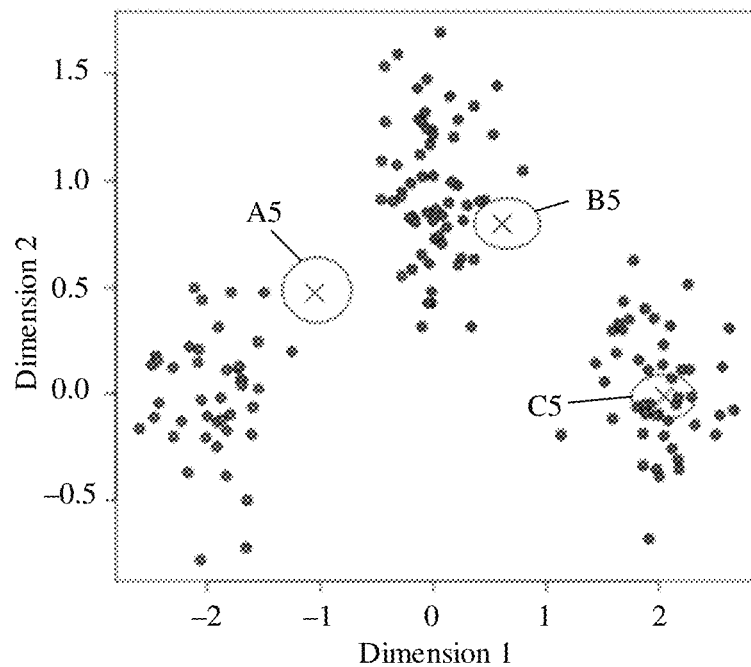
FIG. 11 is a schematic diagram of a clustering process according to an embodiment of this application.

Step 4: Steps 1 to 3 are repeated. The central detection node device continuously adjusts the clustering center point location based on a data clustering location, and then obtains, through re-division based on a new clustering center point location, a cluster to which the data point belongs. Processes shown in FIG. 10 and FIG. 11 are used as an example. The three clustering center point locations are shown as A4, B4, and C4 in FIG. 10 after being adjusted based on A3, B3, and C3 shown in FIG. 9. Then, the three clustering center point locations are re-adjusted to be shown as A5, B5, and C5 in FIG. 11.

Figure 12:
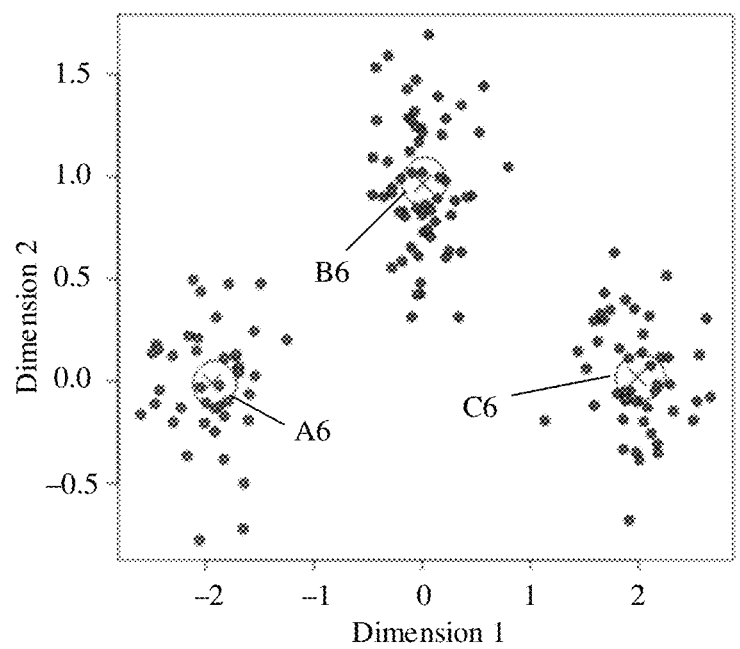
FIG. 12 is a schematic diagram of a clustering process according to an embodiment of this application.

Step 5: After a plurality of rounds of iteration, the clustering center point location and a data point distribution are finally stable, a clustering center point location that satisfies a data distribution is obtained, and a data point is properly classified into a clustering group. A final clustering result shown in FIG. 12 may be used as an example. In FIG. 12, three clustering center points in the final clustering result are respectively shown as A6, B6, and C6 in FIG. 12.

Based on the foregoing KMeans clustering algorithm principle and operation process, UEs of the current periodicity in Table 2 are clustered based on a signaling category count by using the KMeans algorithm. For example, the central detection node device divides the UEs into two groups based on core network signaling data corresponding to the UEs and clustering center point locations, and finds behavior clustering centers of the two groups. For any selected UE group, a signaling category count array corresponding to a clustering center of the selected UE group is an average value of signaling category count arrays corresponding to all user identifiers in the selected UE group. Specifically, a vector value of a vector i in a signaling category count array corresponding to a clustering center of a selected UE group is an average value of vector values of vectors i in signaling category count arrays corresponding to all user identifiers in the selected UE group. For example, two clustering results of T−1 periodicity data are represented by using clustering centers as follows. A label "0" is used to represent a signaling category count array corresponding to a clustering center of a first UE group in the clustering result, and a label "1" is used to represent a signaling category count array corresponding to a clustering center of a second UE group.

Label 0: [14.335892514395393, 0.0, 0.0, 0.0, 0.0, 0.0, 1.0316698656429941, 0.0, 0.0, 0.0, 25.07581573896353, 62.646833013435696, 0.0, 0.0, 0.0, 0.0, 31.130518234165066, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0].

Label 1: [14.036862003780719, 0.0, 0.0, 0.0, 0.0, 0.0, 0.6729678638941399, 0.0, 0.0, 0.0, 22.689035816824196, 55.18147448015123, 0.0, 0.0, 0.0, 0.0, 29.207939508506616, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0].

A user identifier (IMSI) of UE included in the first UE group whose label is "0" and a user identifier of UE included in the second UE group whose label is "1" are respectively shown as follows:

User identifiers corresponding to the label 0: [460030912121001, 460030912121002, 460030912121003, 460030912121004, 460030912121005, 460030912121006, 460030912121007, 460030912121008, 460030912121009, 460030912121010, 460030912121011, 460030912121012, 460030912121013, 460030912121014, 460030912121015, 460030912121016, 460030912121017, 460030912121018, 460030912121019, 460030912121020, 460030912121021, 460030912121022, 460030912121023, 460030912121024, 460030912121025, 460030912121026, 460030912121027, 460030912121028].

User identifiers corresponding to the label 1: [460031912121001, 460031912121002, 460031912121003, 460031912121004, 460031912121005, 460031912121006, 460031912121007, 460031912121008, 460031912121009, 460031912121010, 460031912121011, 460031912121012, 460031912121013, 460031912121014, 460031912121015, 460031912121016, 460031912121017, 460031912121018, 460031912121019, 460031912121020, 460031912121021, 460031912121022, 460031912121023, 460031912121024, 460031912121025, 460031912121026, 460031912121027, 460031912121028].

A user signaling category count array of a clustering center of a UE profile is represented by using a "signaling category count average". A clustering result corresponding to the label 0 in the UE profile of the current periodicity is used as an example. A first field "14.335892514395393" corresponds to an average value corresponding to a first signaling category "Attach" in signaling categories. By analogy, signaling categories in subsequent corresponding sequences are shown in Table 3.

As shown above, the clustering result includes at least two UE groups, each of the at least two UE groups has a clustering center, for any selected UE group in the at least two UE groups, a signaling category count array corresponding to a clustering center of the selected UE group is an N-dimensional vector, a vector value of a vector i in the signaling category count array corresponding to the clustering center of the selected UE group is an average value of vector values of vectors i in signaling category count arrays corresponding to all user identifiers in the selected UE group, and a feature value of the selected UE group is a sum calculation result of N vector values included in the signaling category count array corresponding to the clustering center of the selected UE group. A process in which the central detection node device compares the UE profile of the

TABLE 3

| Signaling procedure category name | Quantity of signaling procedures |
|---|---|
| 00: "Attach", | 14.33589251 |
| 01: "Intra_USN_Intra_E-UTRAN_TAU", | 0 |
| 02: "Inter_USN_Intra_E-UTRAN_TAU", | 0 |
| 05: "Ms_Init_Detach", | 0 |
| 06: "CN_Init_Detach", | 0 |
| 0A: "Paging", | 0 |
| 0B: "Service_Request", | 1.031669866 |
| 0C: "Intra_USN_GERAN_to_E-UTRAN_Inter_RAT_TAU", | 0 |
| 0D: "Intra_USN_UTRAN_to_E-UTRAN_Inter_RAT_TAU", | 0 |
| 10: "Inter_USN_GERAN/UTRAN_to_E-UTRAN_TAU", | 0 |
| 12: "Intra_USN_E-UTRAN_to_GERAN_Inter_RAT_RAU", | 25.07581574 |
| 13: "Intra_USN_E-UTRAN_to_UTRAN_Inter_RAT_RAU", | 62.64683301 |
| 16: "Inter_USN_E-UTRAN_to_GERAN/UTRAN_Inter_RAT_RAU", | 0 |
| 18: "Combined_Attach", | 0 |
| 19: "Intra_USN_Intra_E-UTRAN_Combined_TAU", | 0 |
| 1A: "Inter_USN_Intra_E-UTRAN_Combined_TAU", | 0 |
| 1B: "Intra_USN_GERAN_to_E-UTRAN_Inter_RAT_Combined_TAU", | 31.13051823 |
| 1C: "Intra_USN_UTRAN_to_E-UTRAN_Inter_RAT_Combined_TAU", | 0 |
| 1D: "Inter_USN_GERAN/UTRAN_to_E-UTRAN_Combined_TAU", | 0 |
| 1E: "Extended_Service_Request", | 0 |
| 20: "Ms_Init_Combined_Detach", | 0 |
| 21: "Ms_Init_IMSI_Detach", | 0 |
| 22: "CN_Init_IMSI_Detach", | 0 |
| 23: "CN_Init_Implicit_Detach", | 0 |
| 24: "Intra_USN_Intra_E-UTRAN_Periodic_TAU", | 0 |
| 25: "Inter_TAU_Old", | 0 |
| 30: "Dedicated_bearer_activation", | 0 |
| 31: "PDN_GW_initiated_bearer_modification_with_bearer_QoS_update", | 0 |
| 32: "HSS_Initiated_Subscribed_QoS_Modification", | 0 |
| 33: "PDN_GW_initiated_bearer_modification_without_bearer_QoS_update", | 0 |
| 34: "PDN_GW_initiated_bearer_deactivation", | 0 |
| 35: "MME_Initiated_Dedicated_Bearer_Deactivation", | 0 |
| 36: "UE_requested_bearer_resource_modification", | 0 |
| 37: "UE_requested_PDN_connectivity", | 0 |
| 38: "UE_or_MME_requested_PDN_disconnection", | 0 |
| 3A: "UE_requested_bearer_resource_allocation", | 0 |
| 3B: "Default_bearer_activation_in_attach", | 0 |
| 3C: "MME_requested_PDN_disconnection", | 0 |
| 3D: "Create_Session_with_SGW_relocation", | 0 |
| 03: "eNodeB_S1_Release", | 0 |
| 04: "CN_Init_S1_Release", | 0 |
| 07: "X2_HandOver", | 0 |
| 08: "Intra_MME_S1_HandOver", | 0 |
| 09: "Inter_MME_S1_HandOver", | 0 |
| 0E: "Intra_USN_UTRAN_Iu_mode_to_E-UTRAN_Inter_RAT_handover", | 0 |
| 0F: "Inter_USN_UTRAN_Iu_mode_to_E-UTRAN_Inter_RAT_handover", | 0 |
| 14: "Intra_USN_E-UTRAN_to_UTRAN_Iu_mode_Inter_RAT_handover", | 0 |
| 15: "Inter_USN_E-UTRAN_to_UTRAN_Iu_mode_Inter_RAT_handover", | 0 |
| 26: "Inter_MME_S1_HandOver_old", | 0 |
| 40: "SRVCC_from_E-UTRAN_to_GERAN_or_UTRAN", | 0 |
| 41: "SGs_Paging", | 0 |
| FF: "Unknown", | 0 |
| 46: "Abnormal_IMS_Dedicated_Bearer_Deactivation" | 0 | current periodicity and the UE profile in the reference periodicity, and determines the abnormal UE based on the comparison result includes but is not limited to the following: The central detection node device selects one UE group from all UE groups of the current periodicity, and performs the following processing on the selected UE group, until each UE group of the current periodicity is processed:

calculating a sum of N vector values included in a signaling category count array corresponding to a clustering center of the selected UE group, to obtain a feature value corresponding to the selected UE group; and comparing the feature value corresponding to the selected UE group and feature values corresponding to all UE groups of the reference periodicity one by one, and if the case in which a difference between a feature value corresponding to a UE group and the feature value corresponding to the selected UE group is less than a specified threshold does not exist in the reference periodicity, determining that UE in the selected UE group is abnormal UE.

Figure 13:
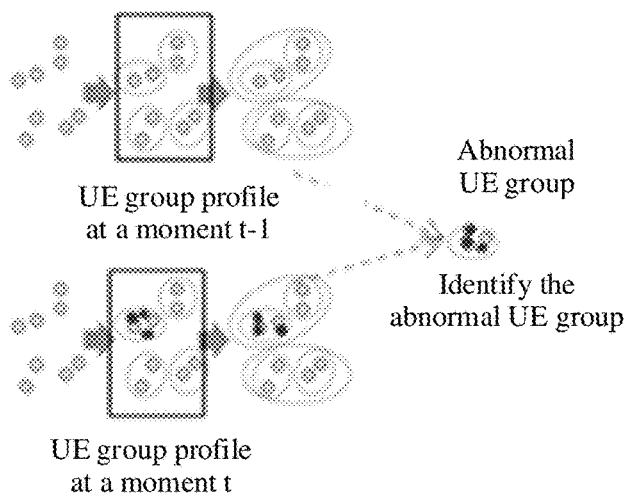
FIG. 13 is a schematic diagram of a UE profile comparison according to an embodiment of this application.

A process in which the UE profile of the current periodicity and the UE profile of the reference periodicity are compared and the abnormal UE is determined based on the comparison result is used as an example. As shown in FIG. 13, a UE group profile of the current periodicity (for example, a moment t) is calculated, and a signaling count change between the UE group profile of the current periodicity and a UE group profile of a previous periodicity (for example, a moment t−1) is obtained through comparison. Because the clustering center represents a center value of a group behavior feature, and a location of the clustering center shifts along with the group behavior feature, the abnormal UE can be found by comparing clustering centers of UE profiles.

For example, the central detection node device selects one UE group from all UE groups of the current periodicity, and calculates a sum of N vector values included in a signaling category count array corresponding to a clustering center of the selected UE group, to obtain a feature value corresponding to the selected UE group. For example, if the selected UE group is a UE group included in a clustering result whose label is 0, the signaling category count array corresponding to the clustering center of the UE group is [14.335892514395393, 0.0, 0.0, 0.0, 0.0, 0.0, 1.0316698656429941, 0.0, 0.0, 0.0, 25.07581573896353, 62.646833013435696, 0.0, 0.0, 0.0, 0.0, 31.130518234165066, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0]. A sum calculation result of all vector values included in the signaling category count array corresponding to the clustering center of the UE group is 134.2207294. In other words, the feature value corresponding to the UE group is 134.2207294. A same method is used to process feature values corresponding to all UE groups of the previous periodicity. Then, the central detection node device compares the feature value corresponding to the selected UE group and the feature values corresponding to all UE groups of the previous periodicity one by one. If the case in which a difference between a feature value corresponding to a UE group and the feature value corresponding to the selected UE group is less than the specified threshold does not exist in the previous periodicity, the central detection node device determines that the UE in the selected UE group is the abnormal UE, and outputs a user identifier or an IP of the abnormal UE.

A value of the threshold is not limited in this embodiment of this application, and may be set based on experience. For example, the threshold is 50%. All fields of center points of all UE groups in a clustering result whose label is 1 in a current periodicity Center_nodes_T (a moment T, a to-be-detected periodicity) are processed, to obtain a sum "241.7882789". All fields of center points of all UE groups in a clustering result whose label is 0 in a previous periodicity Center_nodes_T−1 moment are processed, to obtain a sum "134.2207294". Because "241.7882789" is greater than "134.2207294" and a difference between "241.7882789" and "134.2207294" exceeds the threshold 50%, it is determined that UEs in each UE group in the clustering result whose label is 1 in the current periodicity Center_nodes_T are an abnormal group, and all UEs in the abnormal group are abnormal UEs.

It should be noted that the foregoing provides example descriptions of a process of obtaining the UE profile by using an example in which the behavior feature of the current periodicity includes a periodicity time point used to indicate the current periodicity, a user identifier, and a user signaling category count. In addition, the behavior feature of the current periodicity further includes at least one feature in a total amount of signaling, a signaling sending frequency, and access duration of the UE. In this embodiment of this application, the behavior feature of the current periodicity is not limited. For any behavior feature, refer to the foregoing process of clustering UEs based on the user signaling category count.

403: The central detection node device determines the abnormal group feature based on the abnormal UE.

After determining the abnormal UE, the central detection node device uses, as the abnormal group feature, a feature that can identify the UE. The abnormal group feature includes an identifier or a user data transmission mode used by the abnormal UE to perform communication. For example, after all the UEs in the abnormal group are determined as abnormal UEs, an IMSI and an IP used by the abnormal UE to perform communication are used as abnormal group features of the abnormal UE.

It should be noted that the abnormal group feature includes at least one of an Internet Protocol IP, a port, a protocol type, and an IMSI of the abnormal UE. The foregoing provides descriptions by using the IMSI and the IP as examples. The abnormal group feature is not limited in this embodiment of this application.

404: The central detection node device sends the abnormal group feature to the edge detection node device.

After obtaining the abnormal group feature, the central detection node device sends the abnormal group feature to the edge detection node device, so that the edge detection node device filters to-be-detected data, and detects data obtained after filtering.

After the abnormal group feature is determined by periodically collecting the core network signaling data, a determined abnormal group feature of each periodicity may be immediately sent to the edge detection node device, so that the edge detection node device can filter the to-be-detected data based on the abnormal group feature, to reduce an amount of to-be-detected data.

405: The edge detection node device receives the abnormal group feature sent by the central detection node device.

After receiving the abnormal group feature sent by the central detection node device, the edge detection node device may store the abnormal group feature, to obtain the abnormal group feature during each time of detection.

A manner in which the edge detection node device stores the abnormal group feature is not limited in this embodiment of this application. For example, for the abnormal group feature periodically sent by the central detection node device, the abnormal group feature received each time may be stored based on a periodicity, or an abnormal group feature of the current periodicity may cover an abnormal group feature of the previous periodicity. In other words, the edge detection node device stores only a latest abnormal group feature.

406: The edge detection node device obtains the to-be-detected data.

For example, as shown in FIG. 3, the edge detection node device collects traffic from a network interface card of an optical splitter by using a flow probe, and extracts metadata, to obtain the to-be-detected data. For example, the edge detection node device may obtain the to-be-detected data in real time, or may periodically obtain the to-be-detected data. An occasion and a frequency at which the edge detection node device obtains the to-be-detected data are not limited in this embodiment of this application.

407: The edge detection node device filters to-be-detected data based on the abnormal group feature.

After receiving the abnormal group feature sent by the central detection node device, the edge detection node device filters the to-be-detected data based on the abnormal group feature. A filtering manner includes but is not limited to: selecting, from the to-be-detected data, data that satisfies the abnormal group feature, and using, as the data obtained after filtering, the data that satisfies the abnormal group feature.

For example, the abnormal group feature includes the IP of the abnormal UE. After obtaining the to-be-detected data, the edge detection node device uses, as the data obtained after filtering, to-be-detected data whose IP is the same as the IP of the abnormal UE in the to-be-detected data.

It should be noted that, when the abnormal group feature includes at least two features, and the edge detection node device filters the to-be-detected data based on the abnormal group feature, filtering manners include but are not limited to the following two filtering manners:

Filtering manner 1: To-be-detected data that satisfies all abnormal group features is used as the data obtained after filtering.

For example, the abnormal group feature includes the IP and a port number of the abnormal UE. After obtaining the to-be-detected data, the edge detection node device uses, as the data obtained after filtering, to-be-detected data whose IP is the same as the IP of the abnormal UE and whose port number is the same as the port number of the abnormal UE in the to-be-detected data.

Filtering manner 2: To-be-detected data that satisfies any feature in the abnormal group feature as the data obtained after filtering.

For example, the abnormal group feature includes the IP and a port number of the abnormal UE. After obtaining the to-be-detected data, the edge detection node device uses, as the data obtained after filtering, to-be-detected data whose IP is the same as the IP of the abnormal UE in the to-be-detected data, and uses, as the data obtained after filtering, to-be-detected data whose port number is the same as the port number of the abnormal UE in the to-be-detected data. In this manner, some data obtained after filtering is data whose IP is the same as the IP of the abnormal UE, but whose port number is different from the port number of the abnormal UE. In addition, some data obtained after filtering is data whose IP is different from the IP of the abnormal UE, but whose port number is the same as the port number of the abnormal UE. In addition, some data obtained after filtering is data whose IP is the same as the IP of the abnormal UE, but whose port number is the same as the port number of the abnormal UE. Compared with the filtering manner 1, in the filtering manner 2, a larger amount of data is obtained after filtering, and a detection range is wider.

However, in each of the filtering manners, because filtering is performed based on the abnormal group feature of the abnormal UE, an amount of to-be-detected data is less than a data amount of detecting all to-be-detected data. A specific filtering manner is not limited in this embodiment of this application, and may be set based on a scenario requirement.

The edge detection node device detects the data obtained after filtering.

For example, the edge detection node device detects the data obtained after filtering, including but not limited to detecting, based on a security detection algorithm, the data obtained after filtering, to determine whether the data obtained after filtering is secure. For example, the security detection algorithm includes but is not limited to a C&C channel detection algorithm and a mining algorithm.

For example, as shown in FIG. 3, the edge detection node device collects traffic from a network interface card of an optical splitter by using a flow probe, extracts metadata, to obtain the to-be-detected data, and sends the to-be-detected data to an AIE. The AIE is an edge AI detection engine, and analyzes and detects data reported by the flow probe. After receiving the abnormal group feature sent by the central detection node device, the AIE selects, from the to-be-detected data, the data that satisfies the abnormal group feature, uses, as the data obtained after filtering, the data that satisfies the abnormal group feature, and detects the data obtained after filtering.

Figure 14:
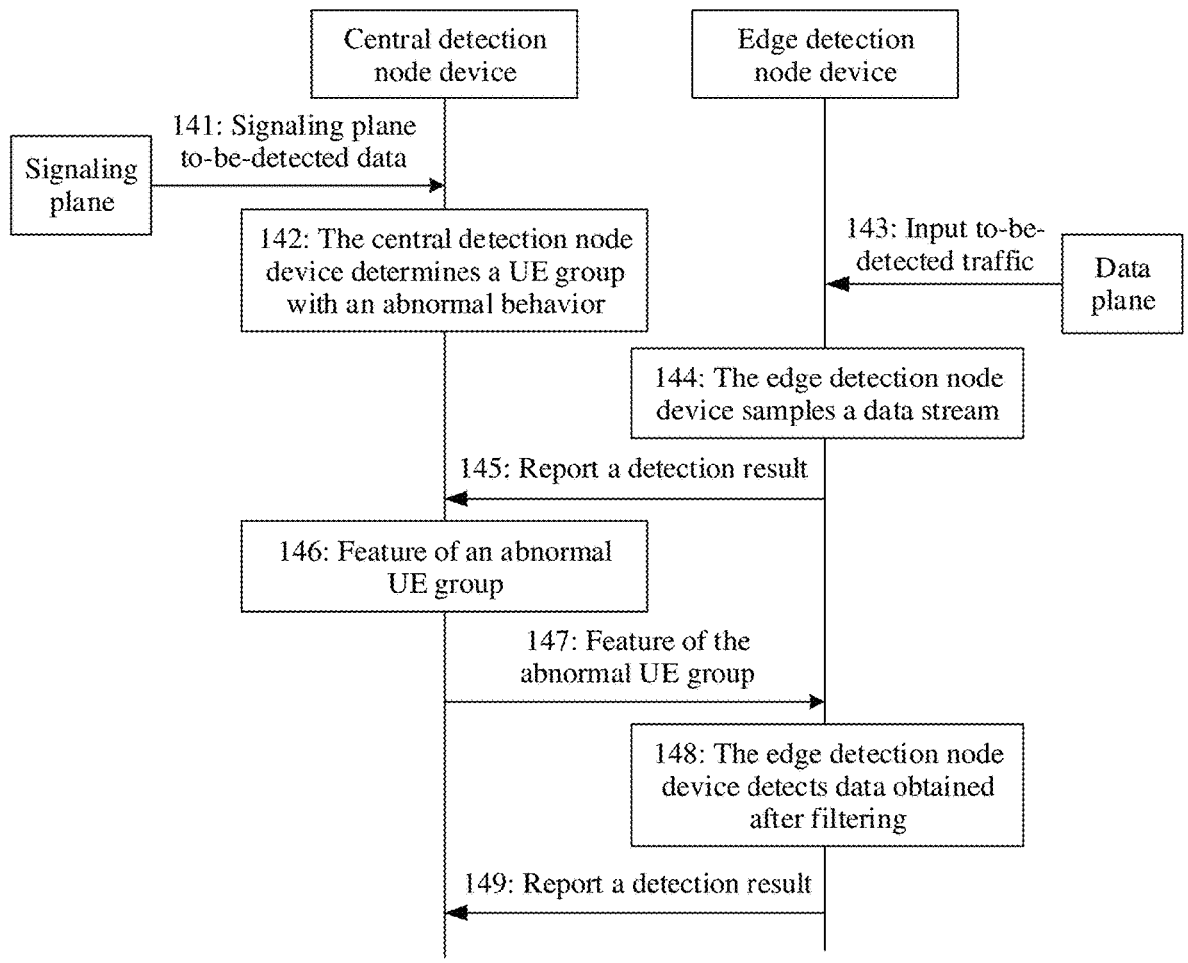
FIG. 14 is a schematic diagram of a process of detecting user data of UE according to an embodiment of this application.

In conclusion, a process in which a central detection node device and an edge detection node device interact in FIG. 14 is used as an example. A data detection method includes the following process.

141: The central detection node device collects core network signaling data, including a total quantity of signaling procedures, a signaling category count, a signaling sending frequency, and terminal access duration. For example, signaling plane to-be-detected data is obtained from a signaling plane, to obtain the core network signaling data.

142: The central detection node device models a profile of core network signaling data of a current periodicity, compares the profile and a UE profile of a previous periodicity, and determines an abnormal UE group.

143: An edge detection system is started. In this case, that no central detection node device delivers a feature IP of an abnormal group is used as a filtering condition. To-be-detected traffic is input from a data plane, and the edge detection node device obtains a to-be-detected data stream.

144: The edge detection node device samples the data stream.

145: Report a detection result to the central detection node device.

146: The central detection node device analyzes and detects signaling plane to-be-detected data, to find an abnormal UE group on the signaling plane. An obtained abnormal group feature is an IP of an abnormal UE. An IP list form of the abnormal UE is used as an example. The abnormal group feature is IP addresses 1.1.1.1, 2.2.2.2, 3.3.3.3, 4.4.4.4, and 5.5.5.5.

147: The central detection node device sends an IP list of the abnormal UE to the edge detection node device.

148: The edge detection node device filters all data plane packets based on the IP list of the abnormal UE, and discards a packet that is not in the IP list of the abnormal UE. In other words, the edge detection node device captures only packets whose IPs of UEs are 1.1.1.1, 2.2.2.2, 3.3.3.3, 4.4.4.4, and 5.5-5.5, generates metadata, and performs security detection.

149: The edge detection node device sends a detection result to the central detection node device.

Figure 15:
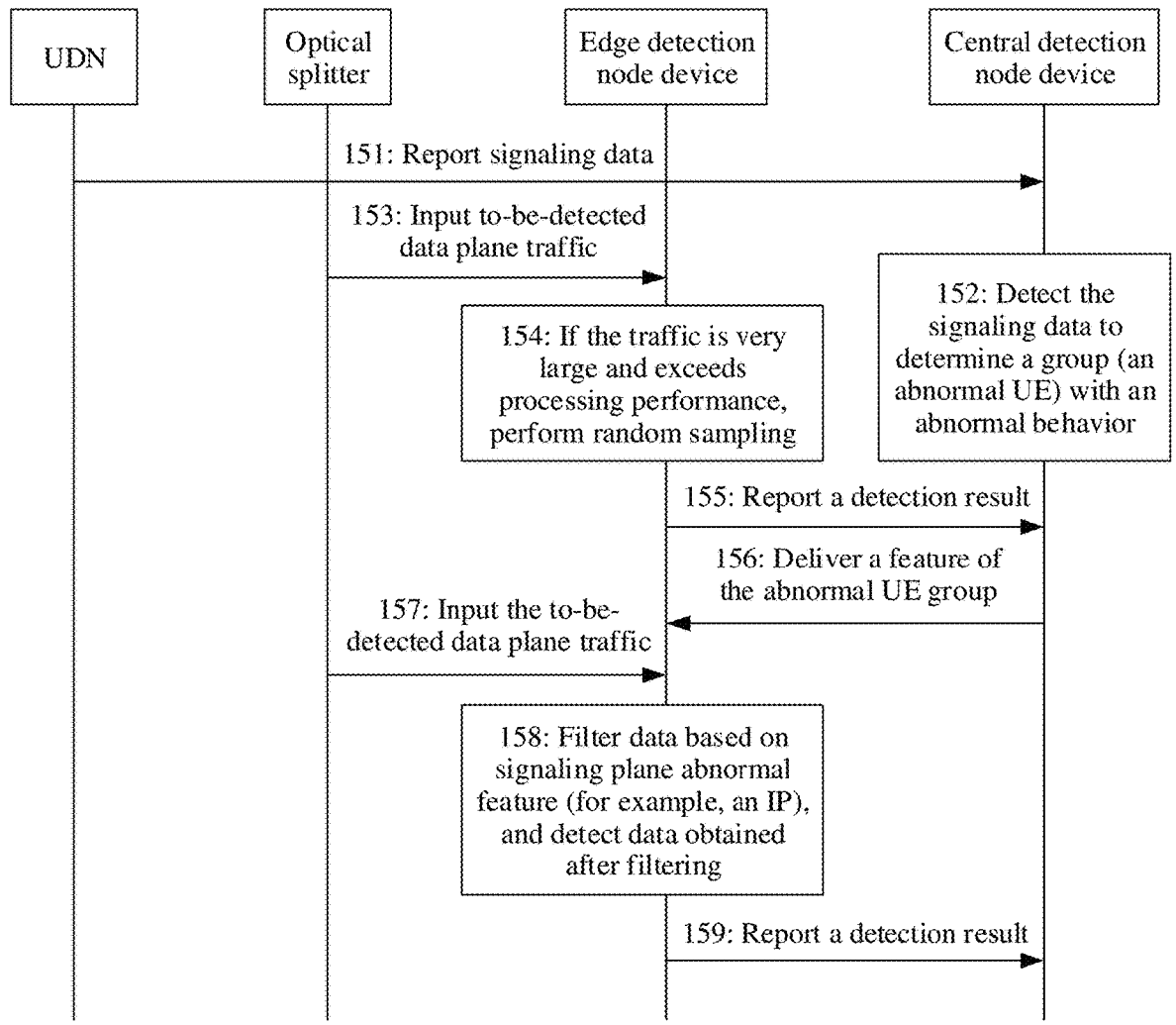
FIG. 15 is a schematic diagram of a process of detecting user data of UE according to an embodiment of this application.

Optionally, in the system architecture shown in FIG. 1, a data detection process is shown in FIG. 15. 151: A UDN reports core network signaling data to a central detection node device, or a collector of a central detection node device collects core network signaling data of a UDN. 152: The central detection node device detects the signaling data, to find an abnormal group. For example, referring to steps 402 and 403 shown in FIG. 4, an abnormal group feature is obtained. Before the abnormal group feature is sent to an edge detection node device, 153 is performed. 153: The edge detection node device obtains input to-be-detected data plane traffic from an optical splitter, in other words, obtains to-be-detected data. 154: If the traffic is very large and exceeds detection processing performance of the edge detection node device, the edge detection node device performs random sampling. 155: The edge detection node device reports a detection result to the central detection node device. 156: After obtaining the abnormal group feature, the central detection node device sends the abnormal group feature to the edge detection node device. 157: After receiving the abnormal group feature, if obtaining the input to-be-detected data plane traffic from the optical splitter, in other words, obtaining the to-be-detected data, the edge detection node device performs 158. 158: The edge detection node device filters the to-be-detected data based on a signaling plane abnormal feature, namely, the abnormal group feature, as shown in step 407 in FIG. 4. 159: After detecting data obtained after filtering, to obtain the detection result, the edge detection node device reports the detection result to the central detection node device. It should be noted that, the detection result reported by the edge detection node device to the central detection node device in the foregoing processes 155 and 159 may be used by the central detection node device to manage and maintain a network device in a core network.

That the central detection node device delivers the abnormal group feature to the edge detection node device is a "feedback" mechanism of detection. In an edge detection scenario, a quantity of resources that can be used are very limited, and it is usually difficult to detect full traffic. Therefore, the "feedback" mechanism can be used to greatly improve detection efficiency and reduce costs when an acceptable detection rate is reduced. In other words, because a machine learning clustering algorithm is used to find the abnormal group on the signaling plane, a quantity of abnormal groups is far less than a quantity of users on a data plane. The edge detection node device filters out most user data based on an abnormal feature of signaling, to improve processing efficiency and performance. For example, if 10000 users or IoT devices in one million users or IoT devices are used for computing in a botnet, it is estimated that 99% traffic may be filtered out, and it is equivalent to that performance is improved by 99 times.

In addition, after the edge detection node device first performs filtering based on the received abnormal group feature delivered by the central detection node device (for example, a condition such as the IP, the protocol type, and the port number obtained through configuration or machine learning), for the data obtained after filtering, the method provided in this embodiment of this application not only supports to perform security detection on the data obtained after filtering, but also supports to perform other detection on the data obtained after filtering. A detection manner and detection content are not limited in this embodiment of this application. For example, there is a process of performing key detection on traffic of the data obtained after filtering.

In the method provided in this embodiment of this application, the central detection node device determines the abnormal UE based on the core network signaling data. Because a quantity of abnormal UEs is less than a quantity of users on the data plane, after the abnormal group feature is determined based on the abnormal UE, the abnormal group feature is sent to the edge detection node device. Therefore, after filtering the to-be-detected data, the edge detection node device detects only the data obtained after filtering, to reduce an amount of to-be-detected data, and improve detection efficiency and detection performance.

Figure 16:
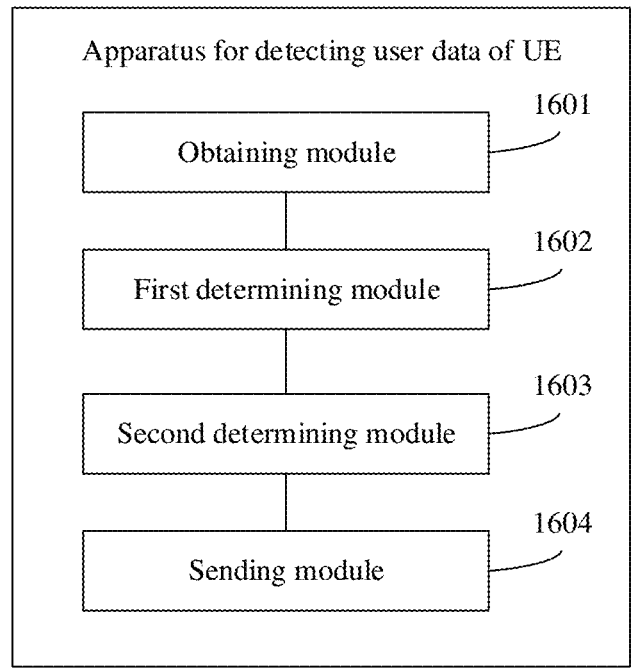
FIG. 16 is a schematic diagram of a structure of an apparatus for detecting user data of UE according to an embodiment of this application.

An embodiment of this application provides an apparatus for detecting user data of UE. The apparatus is configured to perform a function performed by the central detection node device in the embodiment shown in FIG. 4. Referring to FIG. 16, the apparatus includes an obtaining module 1601, a first determining module 1602, a second determining module 1603, and a sending module 1604.

The obtaining module 1601 is configured to obtain core network signaling data. The core network signaling data includes but is not limited to call history record data. For example, for a function performed by the obtaining module 1601, refer to step 401 in the embodiment shown in FIG. 4.

The first determining module 1602 is configured to determine abnormal UE based on the core network signaling data. The abnormal UE is UE with an abnormal behavior. For example, for a function performed by the first determining module 1602, refer to step 402 in the embodiment shown in FIG. 4.

The second determining module 1603 is configured to determine an abnormal group feature based on the abnormal UE. The abnormal group feature includes an identifier or a user data transmission mode used by the abnormal UE to perform communication. For example, for a function performed by the second determining module 1603, refer to step 403 in the embodiment shown in FIG. 4.

The sending module 1604 is configured to send the abnormal group feature to an edge detection node device. For example, for a function performed by the sending module 1604, refer to step 404 in the embodiment shown in FIG. 4.

In an example embodiment, the obtaining module 1601 is configured to obtain core network signaling data of a current periodicity.

The first determining module 1602 is configured to: extract a behavior feature of the current periodicity based on the core network signaling data of the current periodicity, where the behavior feature is a behavior feature of each of a plurality of UEs in a communication process; establish a UE profile of the current periodicity based on the behavior feature of the current periodicity, where the UE profile is used to describe at least one UE group including the plurality of UEs, and UEs in each of the at least one UE group have a same behavior feature; and compare the UE profile of the current periodicity and a UE profile of a reference periodicity, and determine the abnormal UE based on a comparison result, where the reference periodicity is a periodicity before the current periodicity.

In an example embodiment, the behavior feature of the current periodicity includes a time point indication of the current periodicity, one or more user identifiers, and a signaling category count array corresponding to each of the one or more user identifiers, the signaling category count array is an N-dimensional vector, a vector i in the N-dimensional vector corresponds to a signaling category i, a vector value of a vector i in a signaling category count array corresponding to a first user identifier in the one or more user identifiers is a signaling count value of a signaling category i of the first user identifier, a value of N is a natural number, and a value of i is greater than 0 and less than N.

The first determining module 1602 is configured to cluster the plurality of UEs of the current periodicity based on the signaling category count array corresponding to each of the one or more user identifiers, to obtain a clustering result, where the clustering result includes the at least one UE group; and use the obtained clustering result as the UE profile of the current periodicity.

In an example embodiment, the clustering result includes at least two UE groups, each of the at least two UE groups has a clustering center, for any selected UE group in the at least two UE groups, a signaling category count array corresponding to a clustering center of the selected UE group is an N-dimensional vector, a vector value of a vector i in the signaling category count array corresponding to the clustering center of the selected UE group is an average value of vector values of vectors i in signaling category count arrays corresponding to all user identifiers in the selected UE group, and a feature value of the selected UE group is a sum calculation result of N vector values included in the signaling category count array corresponding to the clustering center of the selected UE group.

The first determining module 1602 is configured to select one UE group from all UE groups of the current periodicity, and perform the following processing on the selected UE group, until each UE group of the current periodicity is processed:
  calculating a sum of N vector values included in a signaling category count array corresponding to a clustering center of the selected UE group, to obtain a feature value corresponding to the selected UE group; and comparing the feature value corresponding to the selected UE group and feature values corresponding to all UE groups of the reference periodicity one by one, and if the case in which a difference between a feature value corresponding to a UE group and the feature value corresponding to the selected UE group is less than a specified threshold does not exist in the reference periodicity, determining that UE in the selected UE group is abnormal UE.

In an example embodiment, specified information of the abnormal UE includes at least one of an Internet Protocol IP, a port, a protocol type, and an international mobile subscriber identity IMSI of the abnormal UE.

In an example embodiment, the behavior feature of the current periodicity further includes at least one feature in a total amount of signaling, a signaling sending frequency, and access duration of the UE.

The apparatus provided in this embodiment of this application determines the abnormal UE based on the core network signaling data. Because a quantity of abnormal UEs is less than a quantity of users on a data plane, after the abnormal group feature is determined based on the abnormal UE, the abnormal group feature is sent to the edge detection node device. Therefore, after filtering to-be-detected data, the edge detection node device detects only data obtained after filtering, to reduce an amount of to-be-detected data, and improve detection efficiency and detection performance.

Figure 17:
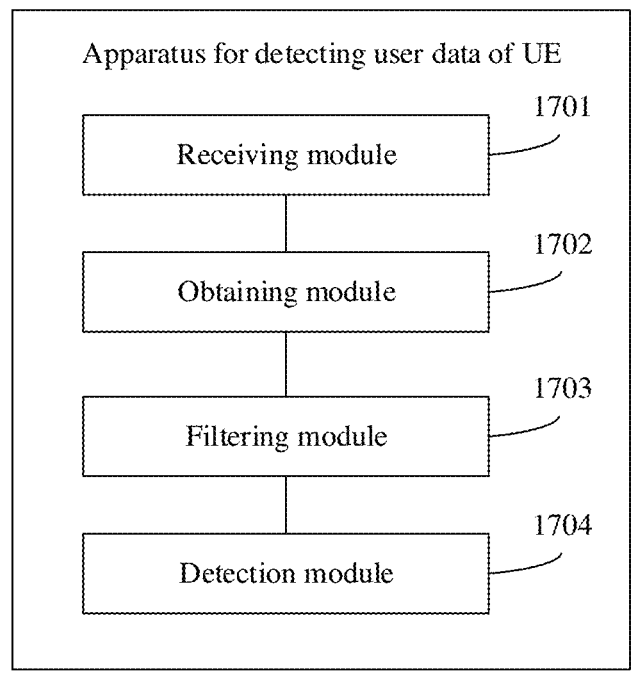
FIG. 17 is a schematic diagram of a structure of an apparatus for detecting user data of UE according to an embodiment of this application.

An embodiment of this application provides an apparatus for detecting user data of UE. The apparatus is configured to perform a function performed by the edge detection node device in the embodiment shown in FIG. 4. Referring to FIG. 17, the apparatus includes a receiving module 1701, an obtaining module 1702, a filtering module 1703, and a detection module 1704.

The receiving module 1701 is configured to receive an abnormal group feature sent by a central detection node device, where the abnormal group feature includes an identifier or a user data transmission mode used by abnormal UE to perform communication. For example, for a function performed by the receiving module 1701, refer to step 405 in the embodiment shown in FIG. 4.

The obtaining module 1702 is configured to obtain to-be-detected data. For example, for a function performed by the obtaining module 1702, refer to step 406 in the embodiment shown in FIG. 4.

The filtering module 1703 is configured to filter the to-be-detected data based on the abnormal group feature. For example, for a function performed by the filtering module 1703, refer to step 407 in the embodiment shown in FIG. 4.

The detection module 1704 is configured to detect data obtained after filtering. For example, for a function performed by the detection module 1704, refer to step 408 in the embodiment shown in FIG. 4.

In an example embodiment, the filtering module 1703 is configured to select, from the to-be-detected data, data that satisfies the abnormal group feature, and use, as the data obtained after filtering, the data that satisfies the abnormal group feature.

In an example embodiment, specified information of the abnormal UE includes at least one of an Internet Protocol IP, a port, a protocol type, and an IMSI of the abnormal UE.

The apparatus provided in this embodiment of this application receives the abnormal group feature sent by the central detection node device. The abnormal group feature is obtained based on the abnormal UE, and a quantity of abnormal UEs is less than a quantity of users on a data plane. Therefore, after to-be-detected data is filtered based on the abnormal group feature, only data obtained after filtering is detected, to reduce a quantity of to-be-detected, and improve detection efficiency and detection performance.

It should be noted that, when the apparatus provided in FIG. 16 or FIG. 17 implements the functions of the apparatus, division into the foregoing functional modules is merely used as an example for description. In an actual application, the foregoing functions may be allocated to different functional modules for completion based on a requirement. In other words, an internal structure of a device is divided into different functional modules, to implement all or some functions in the foregoing descriptions. In addition, the apparatus provided in embodiments pertains to a same concept as the method embodiments. For a specific implementation process, refer to the method embodiments. Details are not described herein again.

Figure 18:
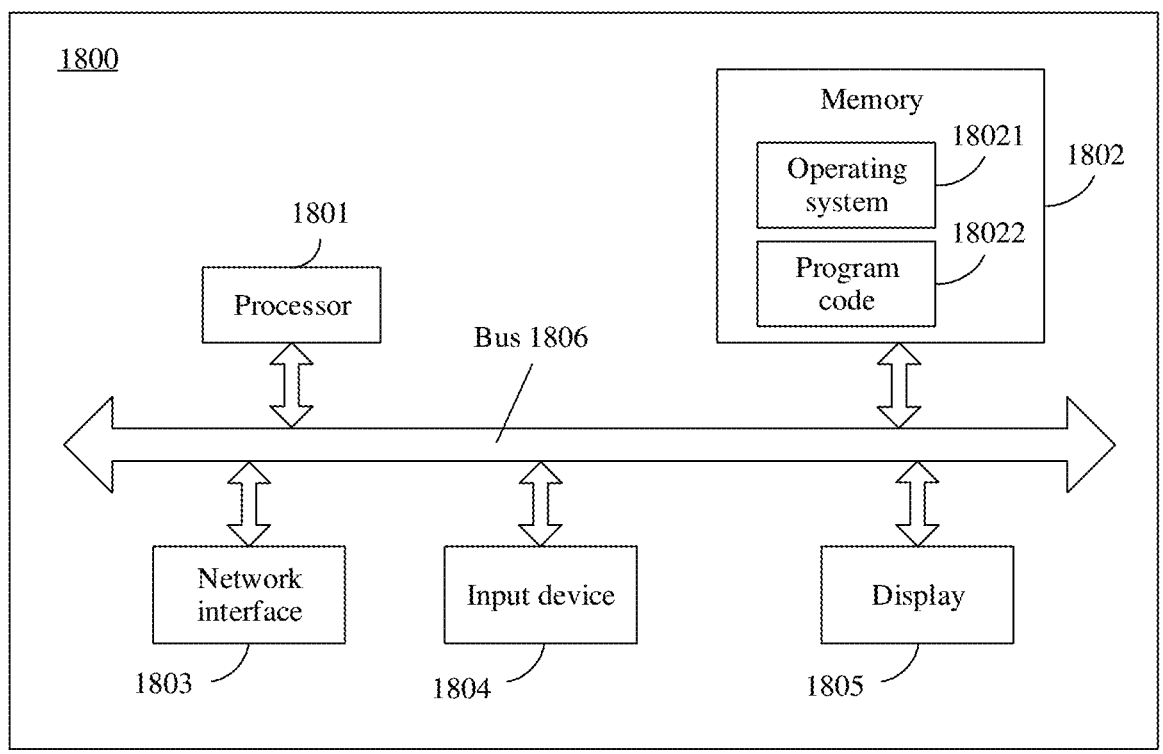
FIG. 18 is a schematic diagram of a structure of a device for detecting user data of UE according to an embodiment of this application.

FIG. 18 is a schematic diagram of a hardware structure of a device 1800 for detecting user data of UE according to an embodiment of this application. The device 1800 for detecting user data of UE in FIG. 18 may perform corresponding steps performed by the central detection node device or the edge detection node device in the method in the embodiment shown in FIG. 4.

As shown in FIG. 18, the device 1800 for detecting user data of UE includes a processor 1801, a memory 1802, a network interface 1803, and a bus 1806. The network interface 1803 may be implemented in a wireless or wired manner, and specifically, may be a network interface card. The processor 1801, the memory 1802, and the network interface 1803 are connected through the bus 1806.

The network interface 1803 may include a transmitter and a receiver. For example, when the device 1800 for detecting user data of UE is a central detection node device, the network interface 1803 is configured to receive core network signaling data, and send an abnormal group feature to an edge detection node device, in other words, perform processing steps of 401 and 404 in the embodiment shown in FIG. 4. For another example, when the device 1800 for detecting user data of UE is an edge detection node device, the network interface 1803 is configured to receive an abnormal group feature sent by a central detection node device, and perform a processing step of 405 in the embodiment shown in FIG. 4. The processor 1801 is configured to perform processing-related steps of 406 to 408 in the embodiment shown in FIG. 4.

The memory 1802 includes an operating system 18021 and program 18022, and is configured to store a program, code, or instructions. When the processor 1801 or a hardware device executes the program, the code, or the instructions, a processing process related to the device 1800 for detecting user data of UE in the method embodiments may be completed. Optionally, the memory 1802 may include a read-only memory (ROM) and a random access memory (RAM). The ROM includes a basic input/output system (BIOS) or an embedded system. The RAM includes an application and an operating system. When the device 1800 for detecting user data of UE needs to be run, the BIOS fixed in the ROM or a boot system bootloader in the embedded system is used to boot the device 1800 for detecting user data of UE, to guide the device 1800 for detecting user data of UE to enter a normal running state. After the device 1800 for detecting user data of UE enters the normal running state, the application and the operating system in the RAM run, to complete a processing process related to the device 1800 for detecting user data of UE in the method embodiments.

It can be understood that FIG. 18 shows only a simplified design of the device 1800 for detecting user data of UE. In an actual application, the device 1800 for detecting user data of UE may include any quantity of interfaces, processors, or memories. For example, as shown in FIG. 18, the device 1800 for detecting user data of UE further includes an input device 1804 and a display 1805. The input device 1804 may be configured to input a detection-related instruction, and the display 1805 may be configured to display the detection-related instruction, and may further display a data detection result.

It should be understood that the foregoing processor may be a central processing unit (CPU), or may be another general-purpose processor, a digital signal processor (DSP), an application-specific integrated circuit (ASIC), a field-programmable gate array (FPGA), or another programmable logic device, discrete gate or transistor logic device, discrete hardware component, or the like. The general-purpose processor may be a microprocessor, or may be any conventional processor or the like. It should be noted that the processor may be a processor that supports an advanced reduced instruction set computing machine (ARM) architecture.

Further, in an optional embodiment, the memory may include a read-only memory and a random access memory, and provide instructions and data for the processor. The memory may further include a non-volatile random access memory. For example, the memory may further store information about a device type.

The memory may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example rather than limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

A computer-readable storage medium is further provided. The storage medium stores at least one instruction, and the instruction is loaded and executed by a processor, to implement the method for detecting user data of UE in any one of the foregoing embodiments.

This application provides a computer program. When the computer program is executed by a computer, a processor or the computer may perform corresponding steps and/or procedures in the foregoing method embodiments.

A chip is provided, including a processor, configured to invoke, from a memory, instructions stored in the memory, and run the instructions, so that a communications device on which the chip is installed performs the method in any one of the foregoing aspects.

Another chip is provided, including an input interface, an output interface, a processor, and a memory. The input interface, the output interface, the processor, and the memory are connected through an internal connection path, the processor is configured to execute code in the memory, and when the code is executed, the processor is configured to perform the method in any one of the foregoing aspects.

A data detection system is provided. The system includes a central detection node device and an edge detection node device. For a process in which the central detection node device and the edge detection node device detect user data of UE, refer to related steps shown in FIG. 4. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A method, comprising:
   obtaining, by an edge detection node device, an abnormal group feature, wherein the abnormal group feature comprises an identifier of an abnormal user equipment (UE) or a user data transmission mode used by the abnormal UE to perform communication;
   obtaining, by the edge detection node device, to-be-detected data;
   filtering, by the edge detection node device, the to-be-detected data based on the abnormal group feature; and
   detecting, by the edge detection node device, data obtained after filtering.

2. The method according to claim 1, wherein filtering, by the edge detection node device, the to-be-detected data based on the abnormal group feature comprises:
   selecting, from the to-be-detected data, data that satisfies the abnormal group feature, and using, as the data obtained after filtering, the data that satisfies the abnormal group feature.

3. The method according to claim 1, wherein preset information of the abnormal UE comprises at least one of an Internet Protocol (IP) of the abnormal UE, a port of the abnormal UE, a protocol type of the abnormal UE, or an international mobile subscriber identity (IMSI) of the abnormal UE.

4. The method according to claim 1, wherein obtaining, by the edge detection node device, the abnormal group feature, comprises:
   receiving, by the edge detection node device, the abnormal group feature.

5. The method according to claim 1, wherein the edge detection node device comprises a flow probe and an artificial intelligence detection engine.

6. The method according to claim 1, further comprising:
   storing, by the edge detection node device, the abnormal group feature throughout a plurality of times of detection.

7. An device comprises:
   at least one processor; and
   a memory, coupled to the at least one processor and storing instructions that when executed by the at least one processor cause the device to:
      obtain an abnormal group feature, wherein the abnormal group feature comprises an identifier of an abnormal user equipment (UE) or a user data transmission mode used by the abnormal UE to perform communication;
      obtain to-be-detected data;
      filter the to-be-detected data based on the abnormal group feature; and
      detect data obtained after filtering.

8. The device according to claim 7, wherein when executed by the at least one processor, the instructions further cause the device to:
   select, from the to-be-detected data, data that satisfies the abnormal group feature; and
   use, as the data obtained after filtering, the data that satisfies the abnormal group feature.

9. The device according to claim 7, wherein preset information of the abnormal UE comprises at least one of an Internet Protocol (IP) of the abnormal UE, a port of the abnormal UE, a protocol type of the abnormal UE, or an international mobile subscriber identity (IMSI) of the abnormal UE.

10. The device according to claim 7, wherein when executed by the at least one processor, the instructions further cause the device to receive the abnormal group feature.

11. The device according to claim 7, wherein the abnormal group feature is determined based on the abnormal UE and the abnormal group feature comprises an identifier of the abnormal UE or a user data transmission mode used by the abnormal UE to perform communication.

12. The device according to claim 11, wherein the abnormal UE is determined based on core network signaling data.

13. A system, comprising:
   a central detection node device, configured to send an abnormal group feature to an edge detection node device, wherein the abnormal group feature comprises an identifier of an abnormal user equipment (UE) or a user data transmission mode used by the abnormal UE to perform communication; and
   the edge detection node device, configured to:
      obtain the abnormal group feature from the central detection node device;
      obtain to-be-detected data;
      filter the to-be-detected data based on the abnormal group feature; and
      detect data obtained after filtering.

14. The system according to claim 13, wherein the edge detection node device is further configured to:
   select, from the to-be-detected data, data that satisfies the abnormal group feature; and
   use, as the data obtained after filtering, the data that satisfies the abnormal group feature.

15. The system according to claim 13, wherein preset information of the abnormal UE comprises at least one of an Internet Protocol (IP) of the abnormal UE, a port of the abnormal UE, a protocol type of the abnormal UE, or an international mobile subscriber identity (IMSI) of the abnormal UE.

16. The system according to claim 13, wherein the abnormal group feature is determined based on the abnormal UE and the abnormal group feature comprises an identifier of the abnormal UE or a user data transmission mode used by the abnormal UE to perform communication.

17. The system according to claim 13, wherein the abnormal UE is determined based on core network signaling data.

18. The system according to claim 17, wherein the central detection node device is further configured to:
   extract, for each UE of a plurality of UEs, a behavior feature of a current period based on core network signaling data of the current period, to obtain a plurality of behavior features, wherein the plurality of behavior features are behavior features of the plurality of UEs in a communication process;

establish a UE profile of the current period based on the plurality of behavior features of the current period, wherein the UE profile describes at least one UE group comprising the plurality of UEs, and UEs in each of the at least one UE group are grouped according to having a common behavior feature;

compare the UE profile of the current period and a UE profile of a reference period; and determine the abnormal UE based on a comparison result, wherein the reference period is a period before the current period.

19. The system according to claim 18, wherein the plurality of behavior features of the current period comprises a time point indication of the current period, one or more user identifiers, and a respective signaling category count array corresponding to each user identifier of the one or more user identifiers, wherein each signaling category count array is an N-dimensional vector, a vector i in each N-dimensional vector corresponds to a signaling category i, a vector value of a vector i in a signaling category count array corresponding to a first user identifier in the one or more user identifiers is a signaling count value of a signaling category i of the first user identifier, a value of N is a natural number, and a value of i is greater than o and less than N; and wherein the edge detection node device is further configured to:

cluster the plurality of UEs of the current period based on each signaling category count array corresponding to each user identifier of the one or more user identifiers, to obtain a clustering result, wherein the clustering result comprises the at least one UE group; and use the obtained clustering result as the UE profile of the current period.

20. The system according to claim 18, wherein the plurality of behavior features comprises at least one of a total amount of signaling, a signaling sending frequency, or access duration of at least one UE.

* * * * *